(12) United States Patent
Matsubara et al.

(10) Patent No.: US 8,018,799 B2
(45) Date of Patent: Sep. 13, 2011

(54) OPTICAL PICKUP DEVICE AND OPTICAL DISC DEVICE

(75) Inventors: Daisuke Matsubara, Tokyo (JP); Masahisa Shinoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 576 days.

(21) Appl. No.: 12/084,260

(22) PCT Filed: Sep. 19, 2006

(86) PCT No.: PCT/JP2006/318511
§ 371 (c)(1),
(2), (4) Date: Aug. 29, 2008

(87) PCT Pub. No.: WO2007/052419
PCT Pub. Date: May 10, 2007

(65) Prior Publication Data
US 2009/0135701 A1 May 28, 2009

(30) Foreign Application Priority Data
Nov. 1, 2005 (JP) .................................. 2005-318176

(51) Int. Cl.
*G11B 7/00* (2006.01)
(52) U.S. Cl. ................ 369/44.15; 369/100; 369/109.01; 369/109.02; 369/44.23
(58) Field of Classification Search .............. 369/44.14, 369/44.23, 112.1, 109.1, 109.2, 110.03; 372/43.01; 365/233; 356/328
See application file for complete search history.

(56) References Cited

U.S. PATENT DOCUMENTS

| | | | | |
|---|---|---|---|---|
| 5,621,714 A | * | 4/1997 | Kobayashi et al. | 369/110.03 |
| 5,625,619 A | * | 4/1997 | Toda et al. | 369/109.02 |
| 6,975,576 B1 | * | 12/2005 | Uchiyama | 369/112.15 |
| 7,230,905 B2 | * | 6/2007 | Kim et al. | 369/112.1 |

(Continued)

FOREIGN PATENT DOCUMENTS
JP 2001-143312 A 5/2001
(Continued)

OTHER PUBLICATIONS

Press information by Sony Co. put on a website (URL:http://www.sony.co.jp/SonyInfo/News/Press Archive/200405/04-026) Date of press: May 17, 2004.

(Continued)

*Primary Examiner* — Thuy Pardo
(74) *Attorney, Agent, or Firm* — Birch, Stewart, Kolasch & Birch, LLP.

(57) ABSTRACT

An optical pickup device is provided. The optical pickup device includes a first, second, and third light emitting portions emitting light beams having first, second, and third wavelengths, respectively; an adjusting element for optical axes enabled to control the optical axis of the return light beam reflected by the optical recording media after output from the light emitting portion, and a single photo detector receiving the return light beams passing through the adjusting element for optical axes. The first light emitting portion and the second light emitting portion are arranged in such a way that the optical axis of the first light beam and the optical axis of the third light beam approximately coincide with each other. The adjusting element for optical axes controls the axis of the return light beam of said second light beam and the single photo detector receives the return light beams of the first light beam, the second light beam and the third light beam.

8 Claims, 23 Drawing Sheets

U.S. PATENT DOCUMENTS

| | | | | |
|---|---|---|---|---|
| 7,453,787 | B2 * | 11/2008 | Ogasawara et al. | 369/112.15 |
| 7,573,801 | B2 * | 8/2009 | Watanabe et al. | 369/112.23 |
| 7,697,369 | B2 * | 4/2010 | Koshizuka | 365/233.1 |
| 7,697,396 | B2 * | 4/2010 | Ogata | 369/112.1 |
| 2001/0021163 | A1 | 9/2001 | Yukawa | |
| 2003/0179373 | A1 * | 9/2003 | Magnusson et al. | 356/328 |
| 2004/0008415 | A1 | 1/2004 | Hayashi | |
| 2005/0152258 | A1 | 7/2005 | Komma et al. | |
| 2005/0276297 | A1 * | 12/2005 | Nishi et al. | 372/43.01 |
| 2007/0242572 | A1 * | 10/2007 | Ogata | 369/44.14 |
| 2008/0232203 | A1 * | 9/2008 | Ogasawara et al. | 369/44.23 |

FOREIGN PATENT DOCUMENTS

| | | |
|---|---|---|
| JP | 2003-57421 A | 2/2003 |
| JP | 2003-302512 A | 10/2003 |
| JP | 2003-302513 A | 10/2003 |
| JP | 2005-141884 A | 6/2005 |
| WO | WO-03/075267 A1 | 9/2003 |
| WO | WO-2006/126357 A1 | 11/2006 |

OTHER PUBLICATIONS

Article put on a website (URL:http//techon.nikkeibp.co.jp/members/New S/20040716/104521), published by Nikkei Business Publications. Inc., May 2004

* cited by examiner

OPTICAL PICKUP DEVICE AND OPTICAL DISC DEVICE

TECHNICAL FIELD

The present invention relates to an optical pickup device by which information can be recording onto and reproducing from plural kinds of optical recording media, and to an optical disc device provided with the optical pickup device, especially relates to an optical pickup device that are configured in such a way that three kinds of light beams whose wavelengths are different from each other are received by a common photo-detector, and to an optical disc device provided with the optical pickup device.

BACKGROUND ART

In the conventional technology, in order to perform recording information onto, reproducing it from, or both recording onto and reproducing from DVD (digital versatile disc) and CD (compact disc), a two-light-source-type optical pickup device has been used that has a DVD laser output unit whose output wavelength is approximately 650 nm, and a CD laser output unit whose output wavelength is approximately 780 nm. Moreover, for the purpose of downsizing each of these light sources, a two-wavelength integrated laser output unit by which beams of two-kind wavelengths can be outputted using a single package has also been practically used. There are known as the two-wavelength integrated laser output unit, for example, a monolithic-type laser output unit that is obtained by forming two laser diodes on a monolithic-type semiconductor substrate, and a hybrid-type laser output unit that is obtained by bonding closely together two semiconductor substrates on each of which a laser diode is formed.

In the two-wavelength integrated laser output unit, beam-emitting portions of the two laser diodes (for DVD and CD) are slightly apart from each other, and the distance therebetween is generally approximately 110 μm. Therefore, when the optical axis of one of the laser diodes coincides with the system optical axis passing through the centers of the objective lens and the collimating lens of the optical pickup device, the optical axis of the laser beam emitted from the other laser diode is displaced from the system optical axis. In the as-is state, each of the return light beams having been outputted from the DVD laser diode and the CD laser diode and then reflected by the optical recording medium cannot be received by a common photo-detector. Accordingly, a method is proposed, in which both of the return light beams are guided to the common photo-detector by diffracting one of the return light beams or both of them, using a diffraction grating, etc., either or both of the return light beams (for example, refer to Patent Documents 1 and 2).

Moreover, in recent years, mass storage of optical recording media has been required, and an optical recording medium such as an optical recording disc, compatible with the blue-violet laser system, whose capacity is several times larger than that of DVD and CD has been practically used. Resultantly, from a viewpoint of device downsizing and cost reduction, a method has been required that information can be recorded onto and reproduced from, for example, DVD, CD, and an optical recording medium compatible with the blue-violet laser system by a single optical pickup device. Consequently, a three-light-source type pickup device having a blue-violet laser diode, in addition to a DVD laser diode and a CD laser diode, has been developed.

As an example of the three-light-source type optical pickup device, the following configuration has been proposed. That is, each of the optical axes of three-kind-wavelength optical beams whose output wavelengths are different from each other, using prisms corresponding to respective wavelengths, made coincident with the system optical axis of the optical pickup device; thereby, light beams of each wavelength are guided to an optical recording medium. Three-kind-wavelength return light beams of the light beams of each wavelength that are reflected by the optical recording medium pass through the respective prisms to be guided to a common photo-detector, and then detected by the photo-detector (for example, refer to Non-Patent Document 1).

[Patent Document 1] Japanese Laid-Open Publication No. 2001-143312

[Patent Document 2] Japanese Laid-Open Publication No. 2001-256670

[Non-Patent Document 1] "Philips, Holland, has developed optical head that enables recording onto and reproducing from CD, DVD, and Blu-ray Disc", [ONLINE], Jul. 16, 2004, Nikkei Business Publications, Inc., [accessed on Feb. 20, 2005], Internet <http://TECHON.nikkeibp.co.jp/members/NEWS/20040716/104521/>

DISCLOSURE OF THE INVENTION

Problems to be Solved by the Invention

However, according to the first configuration (Non-Patent Document 1) described above, although the return light beams reflected by the optical recording medium can be received by the common photo-detector, many prisms etc. are needed for aligning with the system optical axis of the optical pickup device the optical axis of each laser output unit. Moreover, various parts are also needed for mounting onto the optical pickup device each laser output unit. As a result, the number of the constituent parts of the optical pickup device increases; therefore, a problem has occurred that it is difficult to downsize the device and reduce the cost.

Here, in the two-light-source-type optical pickup device, device downsizing and cost reduction have been realized by using the two-wavelength integrated laser output unit and a phase-differential-type diffraction grating (Patent Documents 1 and 2); similarly, in the three-light source type pickup device, device downsizing and cost reduction are required to be realized by using the two-wavelength integrated laser output unit and the phase-differential-type diffraction grating. In this case, a method can be considered that, two light beams, whose wavelengths are different from each other, outputted from a two-wavelength integrated laser output unit and single-wavelength light beam emitted from a single-wavelength type laser output unit are guided to the same optical path by using a prism, etc., and received by a common photo-detector. However, in the phase-differential-type diffraction grating, because a relationship of $$n \sin \theta - nb \sin \theta b = m\lambda/p$$

is established among the wavelength $\lambda$ of the incident light beam, the incident angle $\theta$ of the incident light beam, the refractive index n of the light-incident-side medium, the exiting angle $\theta b$ of the exiting light beam, the refractive index nb of the light-exiting-side medium, the order number m of the diffracted light beam, and the pitch p of the diffraction grating, diffraction angles of the first- or higher-order diffracted light beams of the three light beams, whose wavelengths are different from each other, incident in parallel on the diffraction grating, are different from each other; therefore, a problem occurs that it is difficult to guide to the common photo-detector the return light beams having the three wavelength components.

An objective of the present invention, which is made to solve the above problems, is to provide an optical pickup device, for recording information onto and reproducing it from plural kinds of optical recording media (for example, DVD, CD, and the optical disc compatible with the blue-violet laser system) in which the wavelengths of the light beams used are different from each other, by which three kinds of return light beams reflected by an optical recording medium can be detected by a common photo-detector.

Moreover, another objective of the present invention is to provide an optical disc device that is configured to include the optical pickup device as described above.

Means for Solving the Problem

An optical pickup device according to the invention, is enable to record/reproduce information to/from an optical recording media, the optical pickup device comprising:
a first light emitting portion that emits a first light beam with a first wavelength;
a second light emitting portion that emits a second light beam with a second wavelength;
a third light emitting portion that emits a third light beam with a third wavelength;
an adjusting element for optical axes enable to control the optical axis of the return light beam that is output from said light emitting portion and is reflected by said optical recording media; and
a single photo detector that receives said return light beam passing through said adjusting element for optical axes; and
wherein said first light emitting portion and said second light emitting portion are arranged in such a way that the optical axis of said first light beam and the optical axis of said third light beam approximately coincide with each other;
said adjusting element for optical axes controls the axis of the return light beam of said second light beam; and
said single photo detector receives the return light beams of said first light beam, said second light beam and said third light beam.

ADVANTAGEOUS EFFECT OF THE INVENTION

In the optical pickup device according to the invention, by a simple configuration and an easy control method, three kinds of return light beams reflected by the optical recording medium can be detected by the common photo-detector; therefore, downsizing of the optical pickup device and of the optical disc device using the optical pickup device, and their cost reduction can be realized.

REFERENCE OF NUMERALS 1, 2, 1a, 2a, 1b, 2b, 1c, 2c a laser output unit;
3, 4 a grating;
5, 5a, 5b, 5c dichroic mirror;
6 a polarization prism;
7 a reflecting mirror;
8 a collimating lens;
9 a wavelength plate;
10 an objective lens;
11 an optical disc;
12 a sensor lens;
13 an adjusting element for optical axes;
14 a photo-detector;
15, 16, 17 a light emitting portion;
18, 19, 20 a semiconductor substrate;
21 a diffraction grating;
21a a binary-blazed diffraction grating;
21b an incident face of the binary-blazed diffraction grating;
100 an optical pickup device;
101 a control circuit;
102 a rotationally drive mechanism;
103 a carrying mechanism;
104 a demodulation circuit

BEST MODE FOR CARRYING OUT THE INVENTION

Embodiment 1

Figure 1:
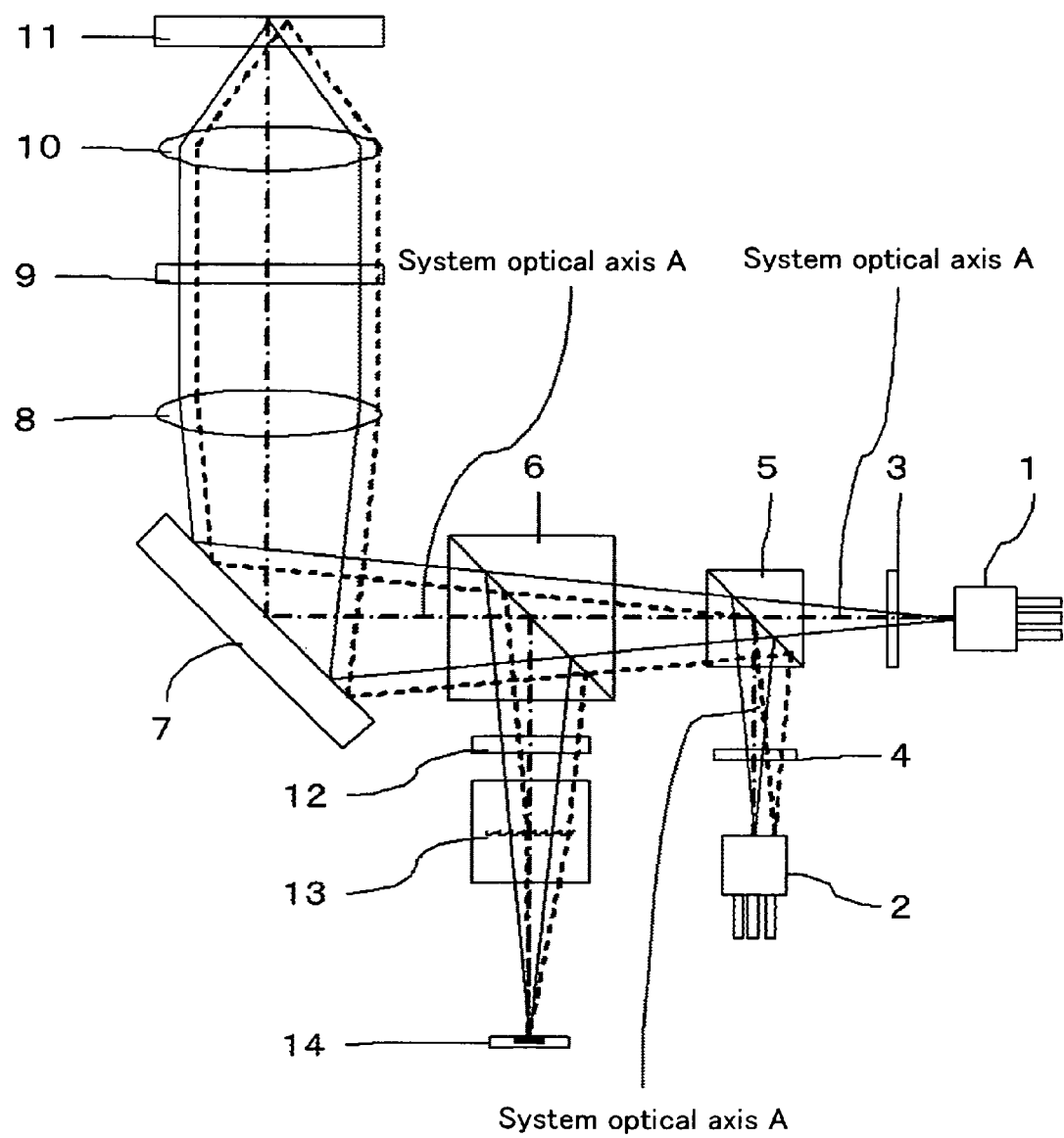
FIG. 1 is a view illustrating an optical system of an optical pickup device according to Embodiment 1 of the invention.
Figure 2:
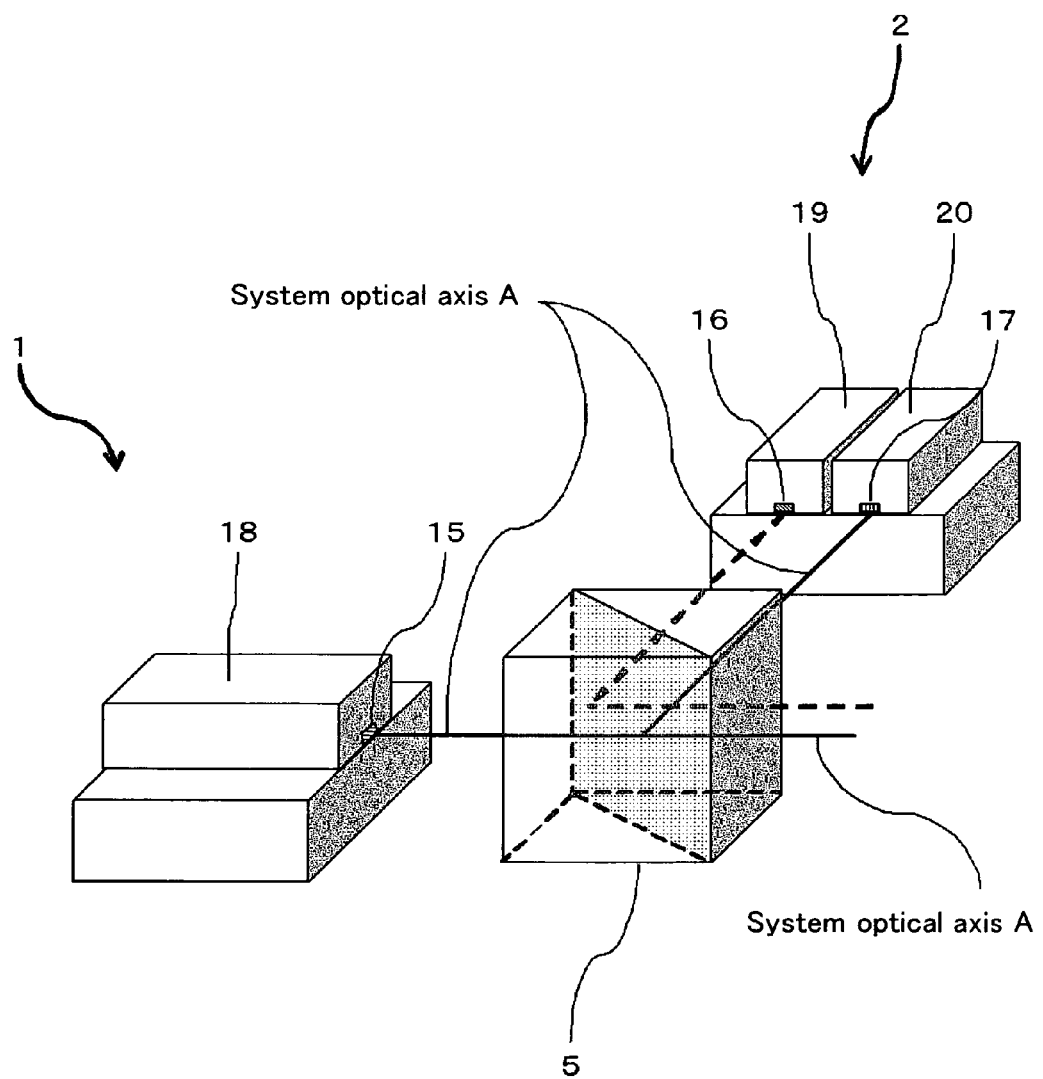
FIG. 2 is a view illustrating a relationship between light emitting portions and system optical axes according to Embodiment 1 of the invention.
Figure 3:
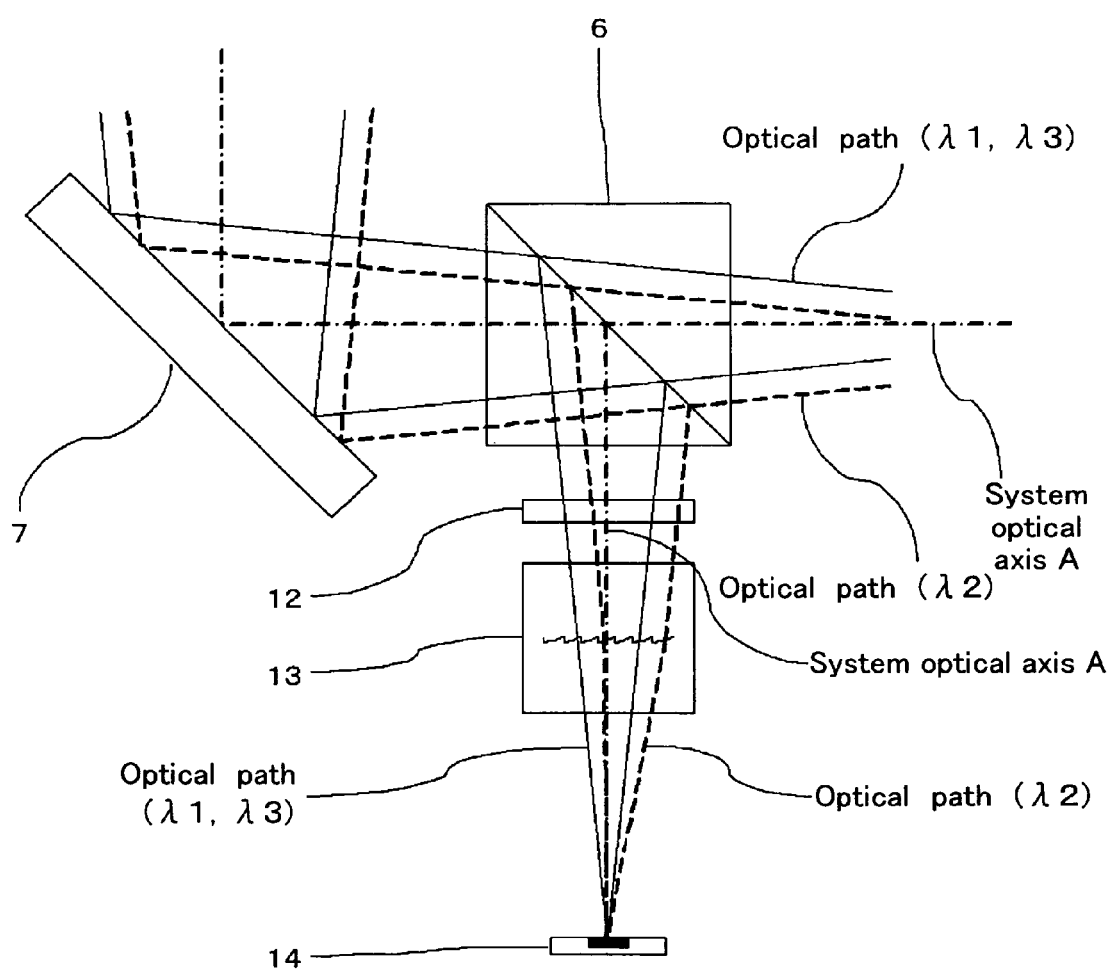
FIG. 3 is a view illustrating a relationship between an adjusting element for optical axes of the optical pickup device and optical paths of light beams of each wavelength, according to Embodiment 1 of the invention.

FIG. 1 is a view illustrating an optical system of an optical pickup device according to Embodiment 1 of the invention. The optical pickup device according to Embodiment 1 records information onto and/or reproduces it from an optical disc, compatible with a blue-violet laser system, whose capacity is several times larger than those of DVD and CD that are conventional optical recording media, in addition to those media. FIG. 2 is a view representing a relationship between system optical axes and each of optical axes of light emitting portions inside a laser output unit used in the optical pickup device according to Embodiment 1. Here, a relationship between each of the light emitting portions and each of the optical axes is represented; however, neither the appearance of the laser output unit nor the grating is illustrated. FIG. 3 is a view representing a relationship between an adjusting element for optical axes of the optical pickup device and optical paths of light beams of each wavelength according to Embodiment 1 of the invention.

In the optical pickup device, a laser output unit 1 and a laser output unit 2 are provided as light sources, in which the laser output unit 1 includes a semiconductor substrate 18 on which a light emitting portion 15 that emits light beam whose wavelength is $\lambda_1$ (approximately 405 nm) is formed, while the laser output unit 2 includes a semiconductor substrate 19 on which a light emitting portion 16 that emits light beam whose wavelength is $\lambda_2$ (approximately 650 nm), and a semiconductor substrate 20 on which a light emitting portion 17 that emits light beam whose wavelength is $\lambda_3$ (approximately 780 nm) is formed; thus, the emitting portions 15, 16, and 17, formed on the semiconductor, each are configured to emit the light beams with the wavelengths of $\lambda_1$, $\lambda_2$, and $\lambda_3$, when a voltage is applied to each of the emitting portions. In FIG. 2, the semiconductor substrate 19 and the semiconductor substrate 20 are separate from each other; however, they may be a so-called monolithic-type semiconductor substrate having been formed by an integration manufacturing process. Here, the semiconductor substrate also means a tip substrate obtained by cutting a semiconductor substrate by dicing etc., when the semiconductor substrate carried in the manufacturing process includes a plurality of laser diodes. This description is also similarly used in the following configuration.

The laser output unit 1 is arranged in the optical pickup device in such a way that the optical axis of the light emitting portion 15 emitting the light beam with the wavelength of $\lambda_1$ is made coincident with the optical axis passing through the center of a collimating lens 8 and an objective lens 10 (the system optical axis A of the optical pickup device).

While, in the laser output unit 2, the semiconductor substrate 19 that emits the wavelength of $\lambda_2$, and the semiconductor substrate 20 that emits the wavelength of $\lambda_3$, are arranged in parallel to each other in the interior thereof, here, due to space limitation, the emitting portion 16 that emits light beam with the wavelength of $\lambda_2$, and the emitting portion 17 that emits light beam with the wavelength of $\lambda_3$ are arranged slightly apart from each other. The distance between the emitting portion 16 and the emitting portion 17 is, for example, 110 µm. Here, in the optical pickup device, the laser output unit 2 is arranged in such a way that the emitting portion 17 emitting the light beam with the wavelength $\lambda_3$ is made coincident with the system optical axis A of the optical pickup device, while the light beam of $\lambda_2$ is emitted from the emitting portion 16 emitting light beam with the wavelength $\lambda_2$ so as to be slightly apart from the system optical axis A, and to be in parallel to the system optical axis A.

The $\lambda_1$ light beam emitted from the laser output unit 1 passes through the system optical axis A, and then through a grating 3. The grating 3 is used for forming a sub beam, generally performed in optical pickup devices, that is needed for detecting a tracking error signal (a three-beam method, a differential push-pull method, etc.). The $\lambda_3$ light beam emitted from the laser output unit 2 passes through the system optical axis A, and then through a grating 4. The $\lambda_2$ light beam travels in parallel along the system optical axis A at a position slightly apart from the system optical axis A of the optical pickup device, and then passes through the grating 4.

The $\lambda_1$ light beam having passed through the grating 3 is incident onto a dichroic mirror 5. The dichroic mirror 5 switches between the reflection operation and the transmission operation according to the wavelength of the incident light. In Embodiment 1, the mirror face of the dichroic mirror 5 is set in such a manner that the light beam with the wavelength of $\lambda_1$ is almost transmitted through the mirror face, while the light beams with the wavelengths of $\lambda_2$ and $\lambda_3$ are almost reflected there; here, the light beam with the wavelength of $\lambda_1$ almost passes through the dichroic mirror 5. The $\lambda_3$ light beam passing through the grating 4 is reflected by the mirror face of the dichroic mirror 5. The light beam with the wavelength of $\lambda_3$ reflected by the dichroic mirror 5 passes through the system optical axis A of the optical pickup device, similarly to the case of the light beam with wavelength $\lambda_1$. The $\lambda_2$ light beam passing through the grating 4 is reflected by the mirror face of the dichroic mirror 5. The light beam with the wavelength of $\lambda_2$ reflected by the dichroic mirror 5 travels in parallel along the system optical axis A at the position slightly apart from the system optical axis A of the optical pickup device.

The light beam with the wavelength of $\lambda_1$ having passed through the dichroic mirror 5, or the light beam with the wavelength of $\lambda_2$ or $\lambda_3$ reflected by the dichroic mirror 5 is incident onto a polarization prism 6. The polarization prism 6 acts as a polarization beam splitter that switches between the reflection operation and the transmission operation corresponding to the polarization direction of the incident light. The crystal-axis direction (polarization direction) of the polarization prism 6 is set so as to pass linearly-polarized light beams with the wavelengths of $\lambda_1$, $\lambda_2$, and $\lambda_3$ that have passed through the dichroic mirror 5.

The optical pickup device further includes a mirror 7 that reflects light beam having passed through the prism 6, the collimating lens 8 onto which the light beam reflected by the mirror 7 is incident, and a wavelength plate 9 onto which the light beam having passed through the collimating lens 8 is incident. The collimating lens 8 is used for changing the incident light into parallel light. The wavelength plate 9 is a so-called quarter-wavelength plate having a function for changing the linear polarization into circular polarization. The light beam having passed through the wavelength plate 9, which is changed to have the circular polarization, is incident onto the objective lens 10, and then, is focused onto a signal recording face of an optical disc 11 (DVD, CD, or an optical disc for a blue-violet laser).

The light beam focused on the signal recording face of each optical disc 11 is modulated corresponding to an information signal recorded on the signal recording face, and is reflected to be return light beam; then, the light beam becomes parallel light again after passing through the objective lens 10, and is incident on to the wavelength plate 9. The polarization of the light beam after passing through the wavelength plate 9 changes from circular to linear; however, the linear polarization direction in this state is approximately 90 degrees different from that when the light beam has traveled forward. The return light beam passing through the wavelength plate 9 passes through the collimating lens 8 to be focusing light flux; then, the light flux is incident onto the polarization prism 6 after being reflected by the mirror 7.

As illustrated in FIG. 3, in the polarization prism 6, due to the polarization-dependent characteristics, the return light beam is polarized at 90 degrees by reflecting the return light beam whose polarization direction is 90 degrees different from that of the light beam traveling forward, and then guided to a sensor lens 12. The sensor lens 12 is used for providing the return light beam with astigmatism needed for detecting a focus error signal, which is generally operated in optical pickup devices. The return light having passed through the sensor lens 12 is incident onto an adjusting element 13 for optical axes.

The adjusting element 13 for optical axes has a function for varying the optical-axis direction of at least one of three return light beams having the respective different wavelengths of $\lambda_1$, $\lambda_2$, and $\lambda_3$. Specifically, due to the diffraction function of a diffraction element provided in the adjusting element 13 for optical axes, the optical-axis direction of the return light beam with the wavelength $\lambda_2$ is varied; thereby, the return light beams having the respective wavelengths of $\lambda_1$, $\lambda_2$, and $\lambda_3$ are configured to be received by the common photo-detector.

The return light beams having the respective wavelengths of $\lambda_1$ and $\lambda_3$ travel so that each of the optical axes approximately coincides with the system optical axis A, of the optical pickup device, passing through the centers of the collimating lens 8 and the objective lens 10, and then are incident onto a photo-detector 14 after having passed through the adjusting element 13 for optical axes. While, because the light emitting portion 16 of the semiconductor substrate 19 that emits the light beam with the wavelength $\lambda_2$ is arranged at the position slightly apart from the light emitting portion 17 that emits the light beam with the wavelength $\lambda_3$, the return light beam with the wavelength $\lambda_2$ is incident, in a state of the optical axis displaced from the system optical axis A, onto the adjusting element 13 for optical axes, and then incident onto the photo-detector 14 after having been diffracted by a binary-blazed diffraction grating provided in the adjusting element 13 for optical axes. That is, also regarding every return-light beam having each wavelength of $\lambda_1$, $\lambda_2$, and $\lambda_3$, the photo-detector 14 can receive them, and each light signal can be detected.

Figure 4:
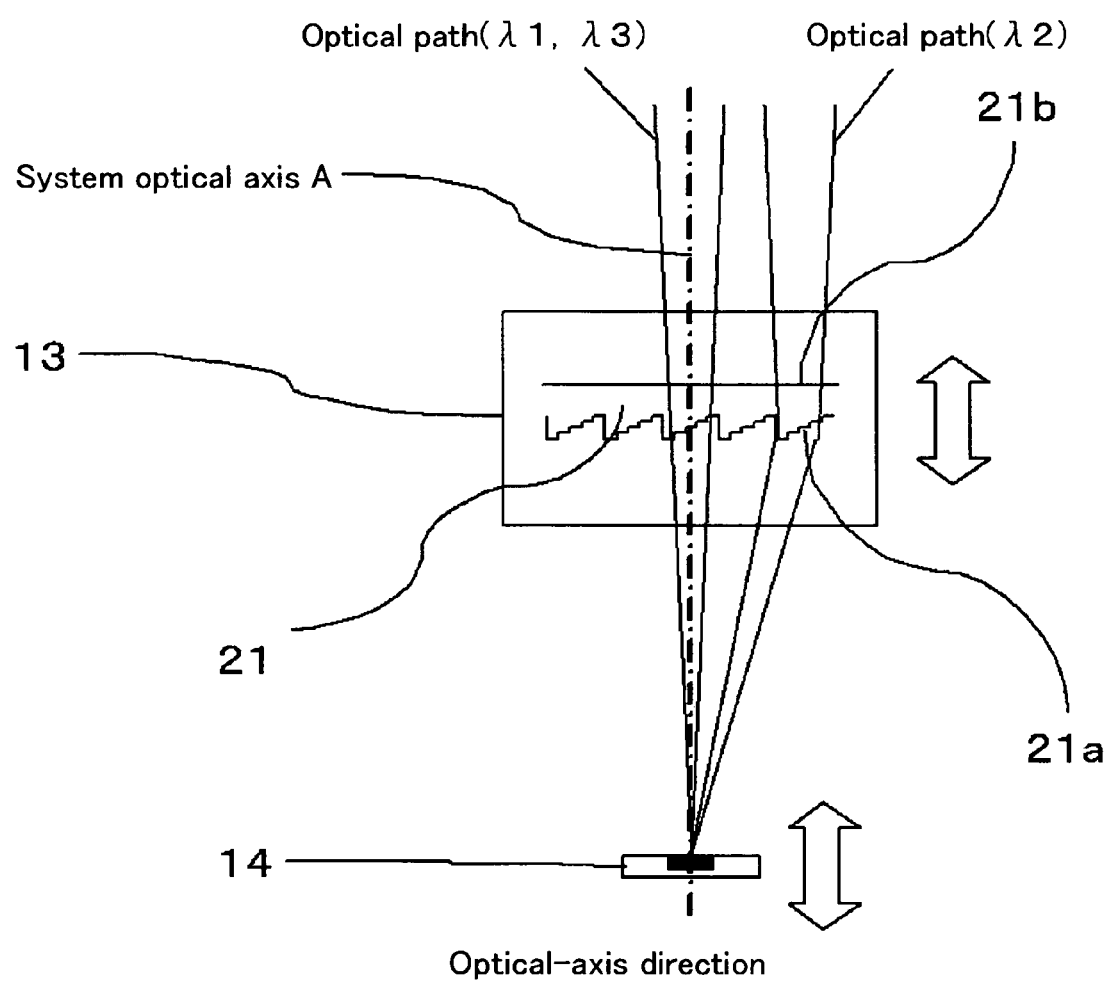
FIG. 4 is a view explaining diffraction in the adjusting element for optical axes of the optical pickup device according to Embodiment 1 of the invention.
Figure 5:
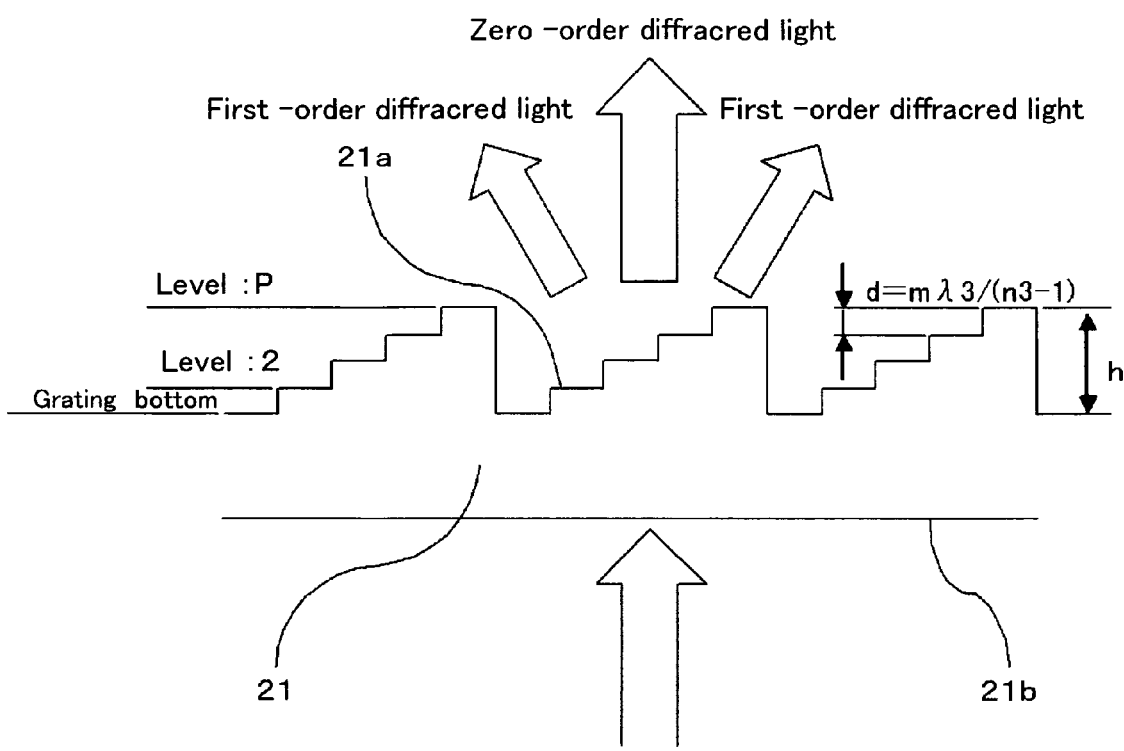
FIG. 5 is an explanatory view of a binary-blazed diffraction grating according to Embodiment 1 of the invention.

Next, operations and configurations of the binary-blazed diffraction grating of the adjusting element for optical axes are explained. FIG. 4 is a view explaining an operation of a binary-blazed diffraction grating 21 provided in the adjusting element 13 for optical axes of the optical pickup device according to Embodiment 1. FIG. 5 is a view illustrating a configuration of the binary-blazed diffraction grating 21.

As represented in FIG. 5, the binary-blazed diffraction grating 21 is made in such a manner that the blazed grating face formed on the exit side is stepwise. A stepwise grating faces 21a are formed by five steps (grating bottom, second step, third step, fourth step, and fifth step). The height (depth) per step of the diffraction grating 21 is taken to be the step height d. Moreover, the number of steps (including the grating bottom) of the diffraction grating 21 is taken to be the level number P. In FIG. 5, "P" is "5". Moreover, the distance from a grating face being the grating bottom to that being the top stage (represented by symbol P) is taken to be the groove depth h.

As represented in FIG. 4, the return light beams having the respective wavelengths of $\lambda_1$ and $\lambda_3$ pass through approximately an identical optical path, and are incident onto an incident face 21b of the binary-blazed diffraction grating 21, and then their zero-order diffracted light beams exit from a grating face 21a of the diffraction grating 21. The zero-order diffracted light beams of the return light beams having the respective wavelengths of $\lambda_1$ and $\lambda_3$ are incident, perpendicularly and at the same position, onto the detection face of the photo-detector 14.

On the other hand, the return light beam with the wavelength $\lambda_2$ passes through an optical path displaced from the optical axis of the return light beams having the respective wavelengths of $\lambda_1$ and $\lambda_3$, is incident, at a constant incident angle, onto an incident face 21b of the diffraction grating 21, and then its first-order diffracted light beam exits from the grating face 21a of the diffraction grating 21. The first-order diffracted light beam of the return light beam with the wavelength $\lambda_2$ is incident, at a constant incident angle (different from the incident angle onto the diffraction grating 21), onto the photo-detector 14.

Because the adjusting element 13 for optical axes, etc. are configured as the above, by moving the adjusting element 13 for optical axes or the photo-detector 14 along the optical-axis direction (optical-axis direction of the return light beams with the wavelengths of $\lambda_1$ and $\lambda_3$) of the incident light, the position at which the return light beam with the wavelength $\lambda_2$ is received can be aligned in the detection face (in the face to which the optical axis of the incident light is perpendicular) of the photo-detector 14. Regarding the return light beams having the respective wavelengths of $\lambda_1$ and $\lambda_3$, because the zero-order diffraction ones are utilized, even if the adjusting element 13 for optical axes and the photo-detector 14 are moved along the optical axis, the light receiving position on the photo-detector 14 does not vary. As a result, the light receiving position of the return light beam with the wavelength $\lambda_2$ can coincide therewith, on the photo-detector 14, of the return light beams having the respective wavelengths of $\lambda_1$ and $\lambda_3$.

Here, assuming that the refractive index, for the wavelength $\lambda_3$, of the material forming the diffraction grating 21 is $n_3$, and m is an integer number not smaller than 1, the step height d of the diffraction grating 21 represented in FIG. 5 can be expressed by $$d \approx m\lambda_3/(n_3-1) \quad \text{Eq. 1}$$

Assuming that the wavelength $\lambda_3$ is 780 nm, and the order m is 1; then, determining the refractive index of the diffraction grating 21 based on the refractive-index data of BK7 grade glass as a general glass material, the step height d can be obtained to be approximately 1.53 μm by Equation 1. Accordingly, the step height d of the diffraction grating 21 is set at 1.53 μm in this embodiment. In the condition given by Equation 1, the intensity of the zero-order diffracted light thereof with the wavelength $\lambda_3$ is most strengthened.

In the binary-blazed diffraction grating 21, if the step height d is an integral multiple of $\lambda/(n-1)$, because the optical-path-length differences, due to the step height d, each become an integral multiple of the wavelength $\lambda$, the maximum value of the zero-order diffraction efficiency can be obtained. Assuming that the wavelength $\lambda_1$ is 405 nm, while $\lambda_3$ is 780 nm, the ratio between the wavelengths is approximately 1.92; thus, the ratio is close to 2. Therefore, if the step height d is set in such a way that the optical-path-length differences each become an integral multiple of the wavelength $\lambda_3$, when assuming that $n_1=n_3$, a value that is also approximately an integral multiple of the wavelength $\lambda_1$ is obtained; consequently, a high zero-order-diffraction efficiency can be obtained for both of the wavelength $\lambda_1$ and the wavelength $\lambda_3$.

Generally, the refractive index of material such as glass and plastic slightly increases with shortening the wavelength. For example, in a case of BK7 grade glass being a general glass material, n=1.53 for the wavelength of 405 nm, while n=1.51 for the wavelength of 780 nm. In a case in which calculation is performed using, as material for the diffraction grating 21, the refractive-index data of the BK7 grade glass being a general glass material, the ratio between $\lambda_3/(n_3-1)$ and $\lambda_1/(n_1-1)$ becomes 1.99; thus, the ratio appears to be closer to an integral multiple than when assuming that $n_1=n_3$. Accordingly, if the step height d of the diffraction grating 21 is set to an integral multiple of $\lambda_3/(n_3-1)$ so that the maximum value of the zero-order diffraction efficiency of the wavelength $\lambda_3$ is obtained, the value of the step height where the maximum value of the zero-order diffraction efficiency of the wavelength $\lambda_1$ is obtained, that is, $\lambda_1/(n_1-1)$ also approaches an integral multiple. As a result, high zero-order-diffraction efficiencies can be obtained for both of the wavelength $\lambda_1$ and the wavelength $\lambda_3$.

Using the refractive-index data of the BK7 grade glass being a general glass material, in a case of the level number P=2, where the grating structure is simplest, assuming that the step height d of the diffraction grating 21 is a variable parameter (d=h, when the level number is 2), the diffraction efficiency of each return light beam is calculated; thereby, regarding the diffraction efficiency of each return light beam, almost maximum values of the zero-order diffraction efficiency at d=1.53 μm can be obtained for both of the wavelengths of $\lambda_1$ and $\lambda_3$.

As described above, the level number P of the diffraction grating 21 is the step number (including the grating bottom) of the diffraction grating 21; thus, P=5 in the example represented in FIG. 5. For the step height d of the diffraction grating 21 when the maximum value of the zero-order diffraction efficiency is obtained, the maximum value of the first-order diffraction efficiency obtained varies for the level number P.

Moreover, as illustrated in FIG. 5, the first-order diffracted light exits in two directions. When the level number P=2, the first-order diffracted light beams exiting in both directions each have the same value; however, when the level number P is not smaller than 3, the first-order diffracted light beams exiting in both directions have different values from each other. Here, assuming that the level number P is a constant not smaller than 3, when h is varied from 0, the first-order diffracted light in which the maximum value can be obtained first, that is, the maximum value can be obtained at a shallow groove depth is defined to be minus first-order diffracted light, while the first-order diffracted light in which the maximum value can be obtained at a deep groove depth is defined to be a plus first-order diffracted light. According to this embodiment, the first-order diffracted light exiting along the steps in FIG. 5 is the minus first-order diffracted light.

Figure 6:
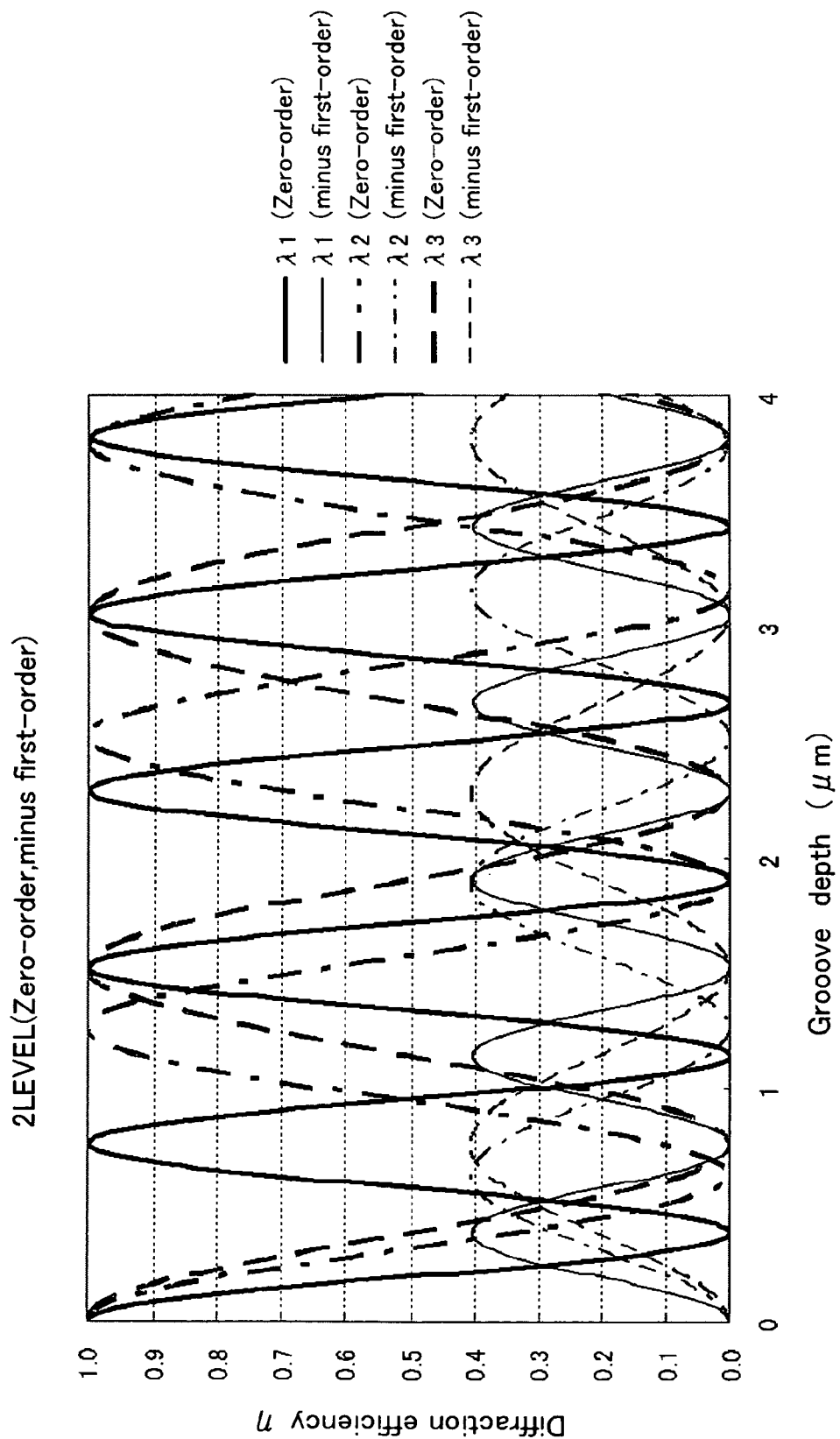
FIG. 6 is a graph representing the zero-order and the minus first-order diffraction efficiencies of the binary-blazed diffraction grating having the level number 2, according to Embodiment 1 of the invention.

In FIG. 6 through FIG. 12, relationships between groove depths h and calculation values of each-order diffraction efficiencies η for each of return light beams are represented, when the level number P of the diffraction grating 21 takes seven different number, namely 2, 3, 4, 5, 6, 7, and 8. Regarding the first-order diffracted light, the values of the minus first-order diffracted light are represented. In the calculation, the refractive-index data of BK7 being general glass material has been used as refractive-index data. Moreover, in FIG. 13 through FIG. 18, the values of the plus first-order diffracted light are represented for six different level numbers P of 3, 4, 5, 6, 7, and 8. When the level number P is 2, the diffraction efficiency of the plus first-order diffracted light is the same as that of the minus first-order diffracted light, which is also represented in FIG. 6.

As represented in FIG. 6, when the level number P=2, the zero-order diffracted light beams with the wavelengths of $\lambda_1$ and $\lambda_3$ each reach approximately the maximum value at the groove depth h of approximately 1.53 μm. Regarding the first-order diffraction efficiency η for the light beam with the wavelength $\lambda_2$ at this time, the minus-first-order-light diffraction efficiency η=0.154, and the plus-first-order-light diffraction efficiency η=0.154.

Figure 7:
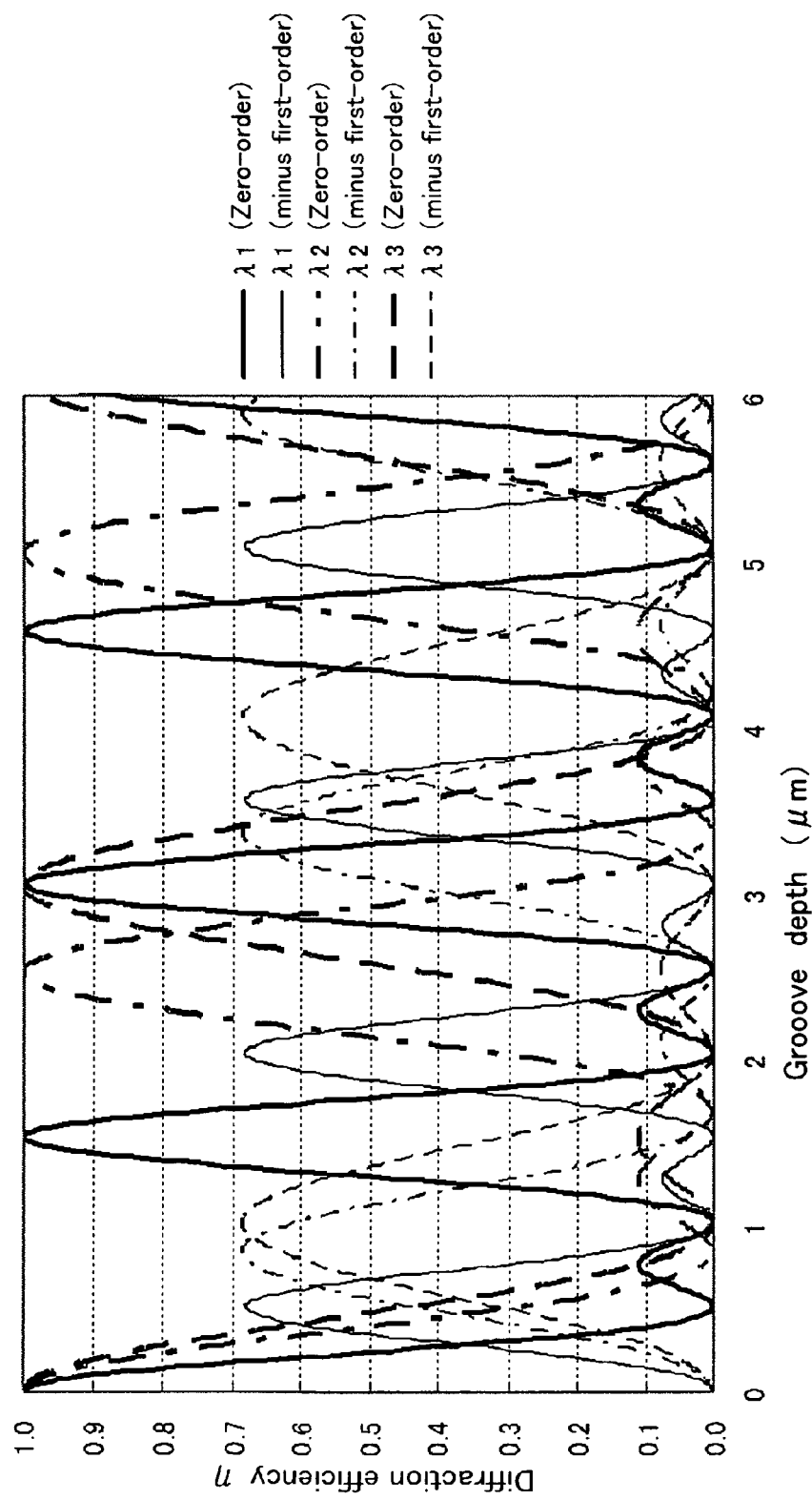
FIG. 7 is a graph representing the zero-order and the minus first-order diffraction efficiencies of the binary-blazed diffraction grating having the level number 3, according to Embodiment 1 of the invention.
Figure 13:
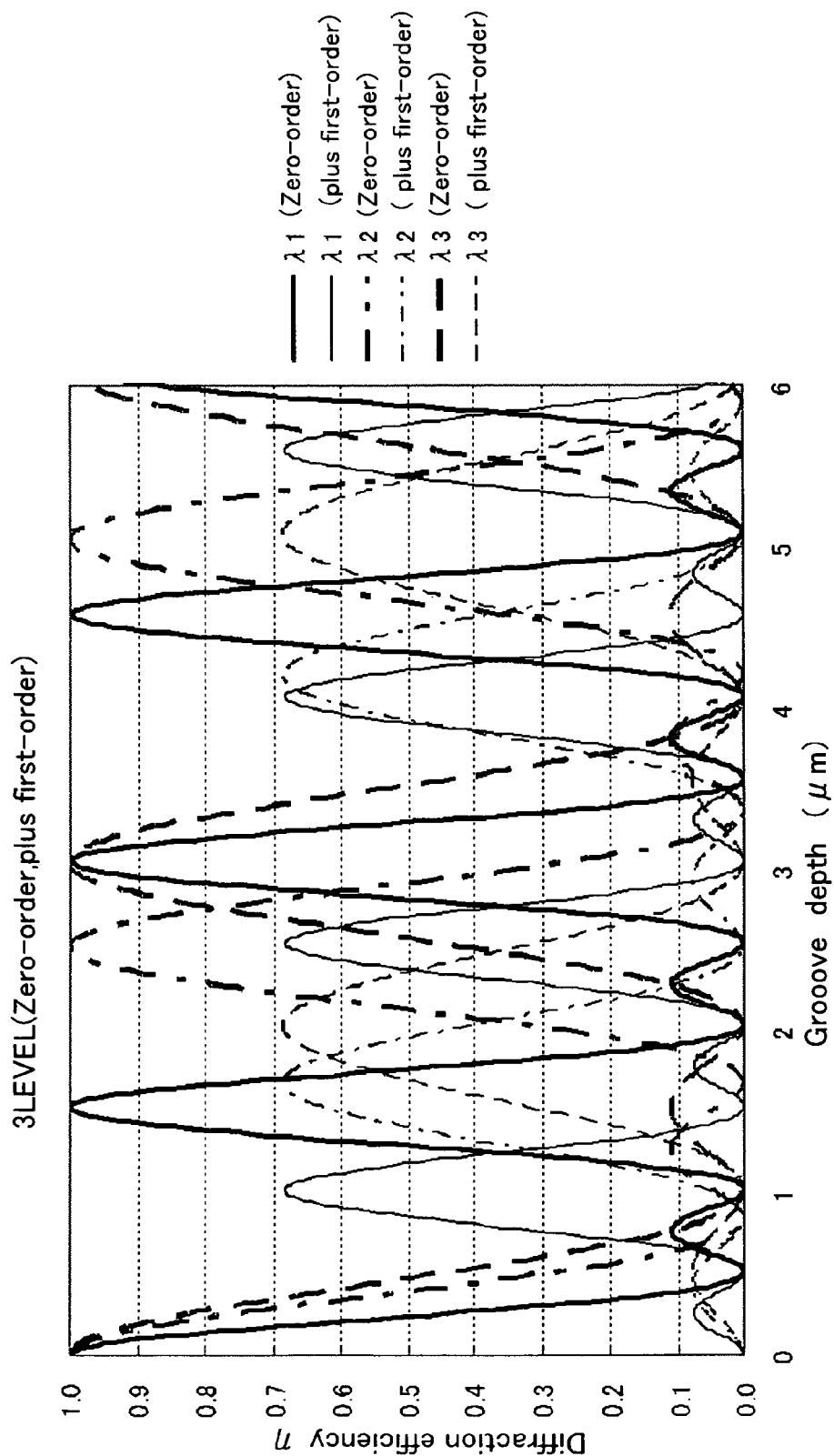
FIG. 13 is a graph representing the zero-order and the plus first-order diffraction efficiencies of the binary-blazed diffraction grating having the level number 3, according to Embodiment 1 of the invention.

As represented in FIG. 7 and FIG. 13, when the level number P=3, the zero-order diffracted light beams with the wavelengths of $\lambda_1$ and $\lambda_3$ each reach approximately the maximum value at the groove depth h of approximately 3.05 μm. Regarding the first-order diffraction efficiency η for the light beam with the wavelength $\lambda_2$ at this time, the minus-first-order-light diffraction efficiency η=0.439, while the plus-first-order-light diffraction efficiency η=0.067.

Figure 8:
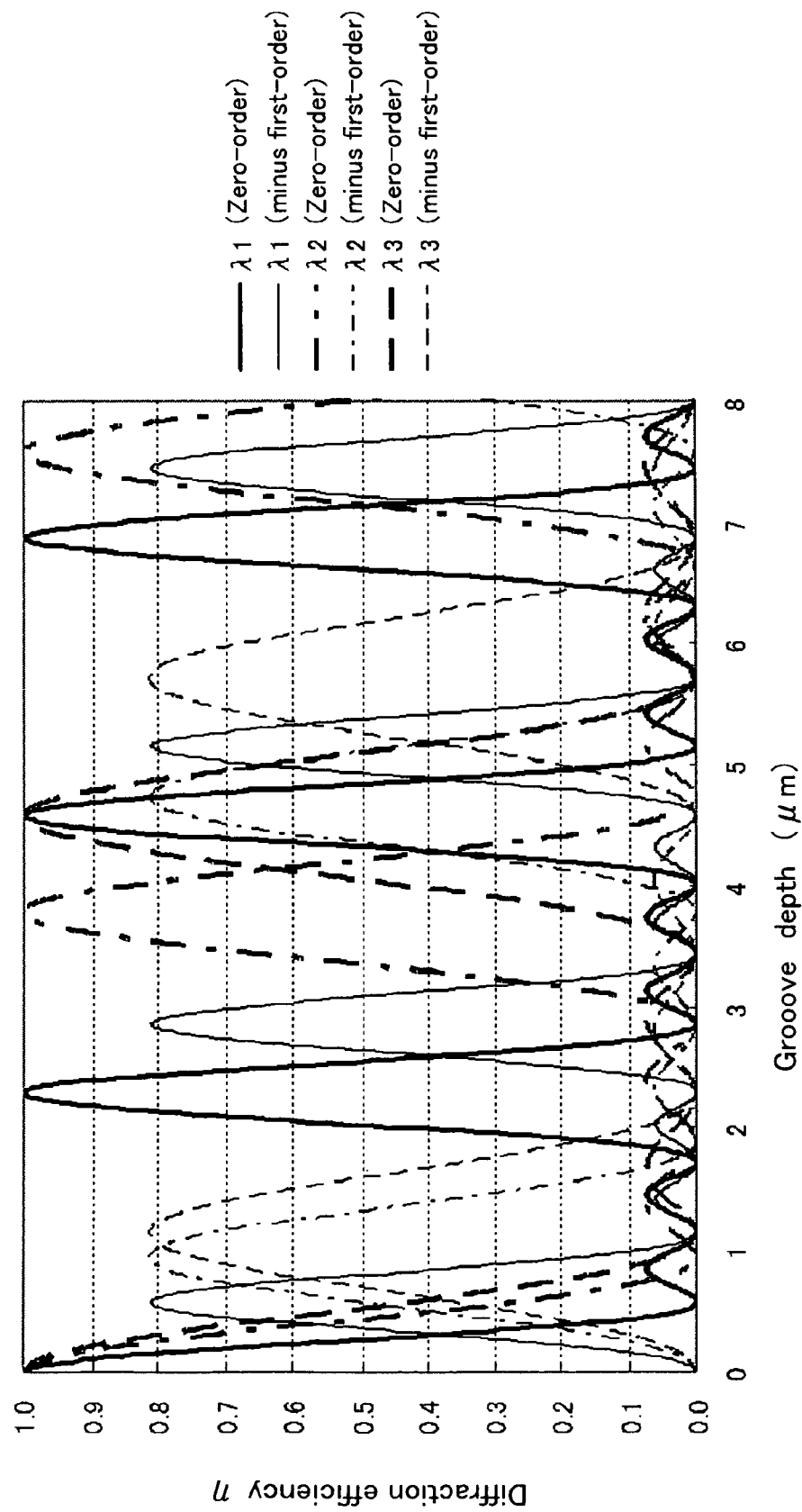
FIG. 8 is a graph representing the zero-order and the minus first-order diffraction efficiencies of the binary-blazed diffraction grating having the level number 4, according to Embodiment 1 of the invention.
Figure 14:
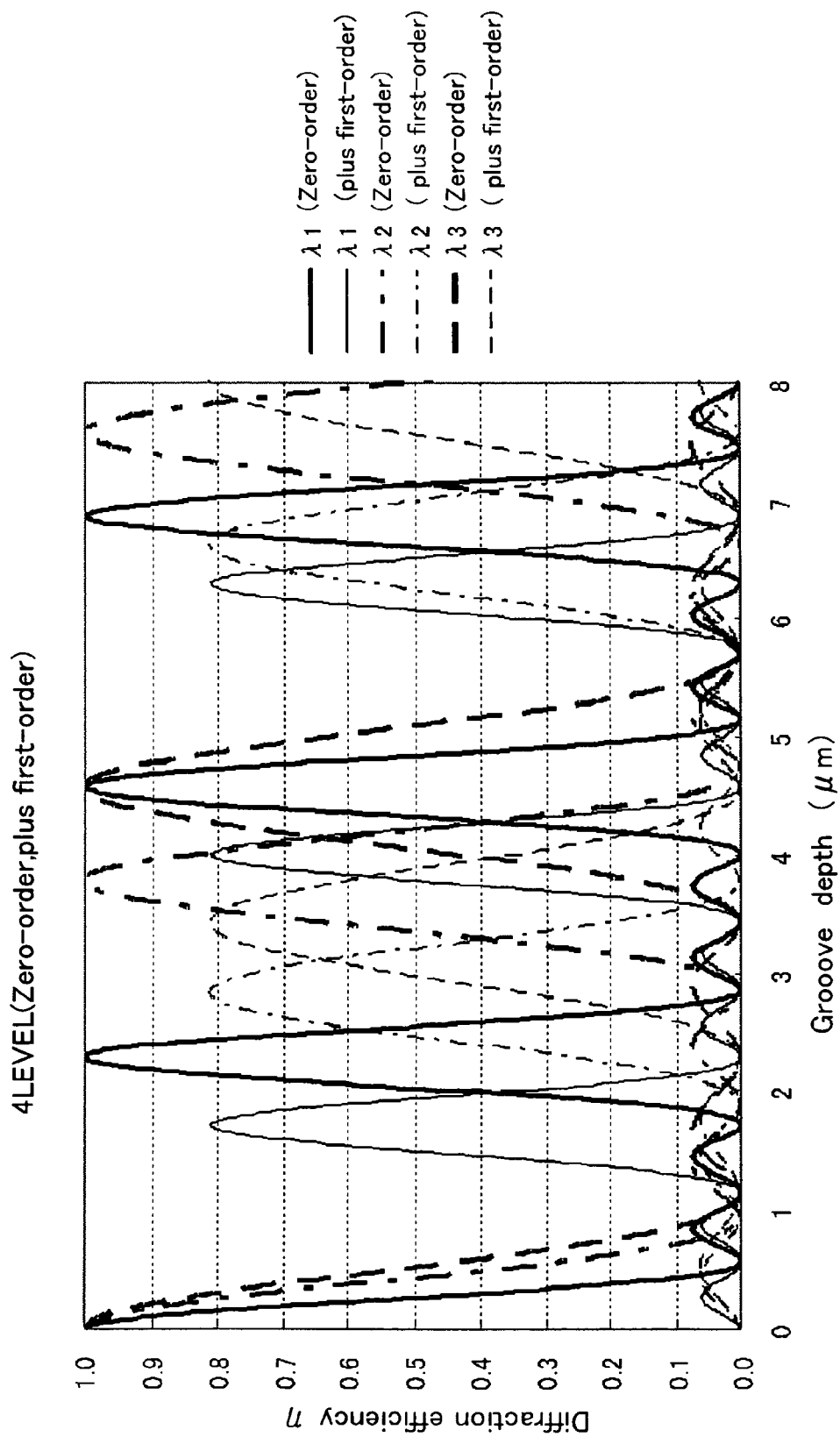
FIG. 14 is a graph representing the zero-order and the plus first-order diffraction efficiencies of the binary-blazed diffraction grating having the level number 4, according to Embodiment 1 of the invention.

As represented in FIG. 8 and FIG. 14, when the level number P=4, the zero-order diffracted light beams with the wavelengths of $\lambda_1$ and $\lambda_3$ each reach approximately the maximum value at the groove depth h of approximately 4.58 μm. Regarding the first-order diffraction efficiency η for the light beam with the wavelength $\lambda_2$ at this time, the minus-first-order-light diffraction efficiency η=0.744, while the plus-first-order-light diffraction efficiency η=0.013.

Figure 9:
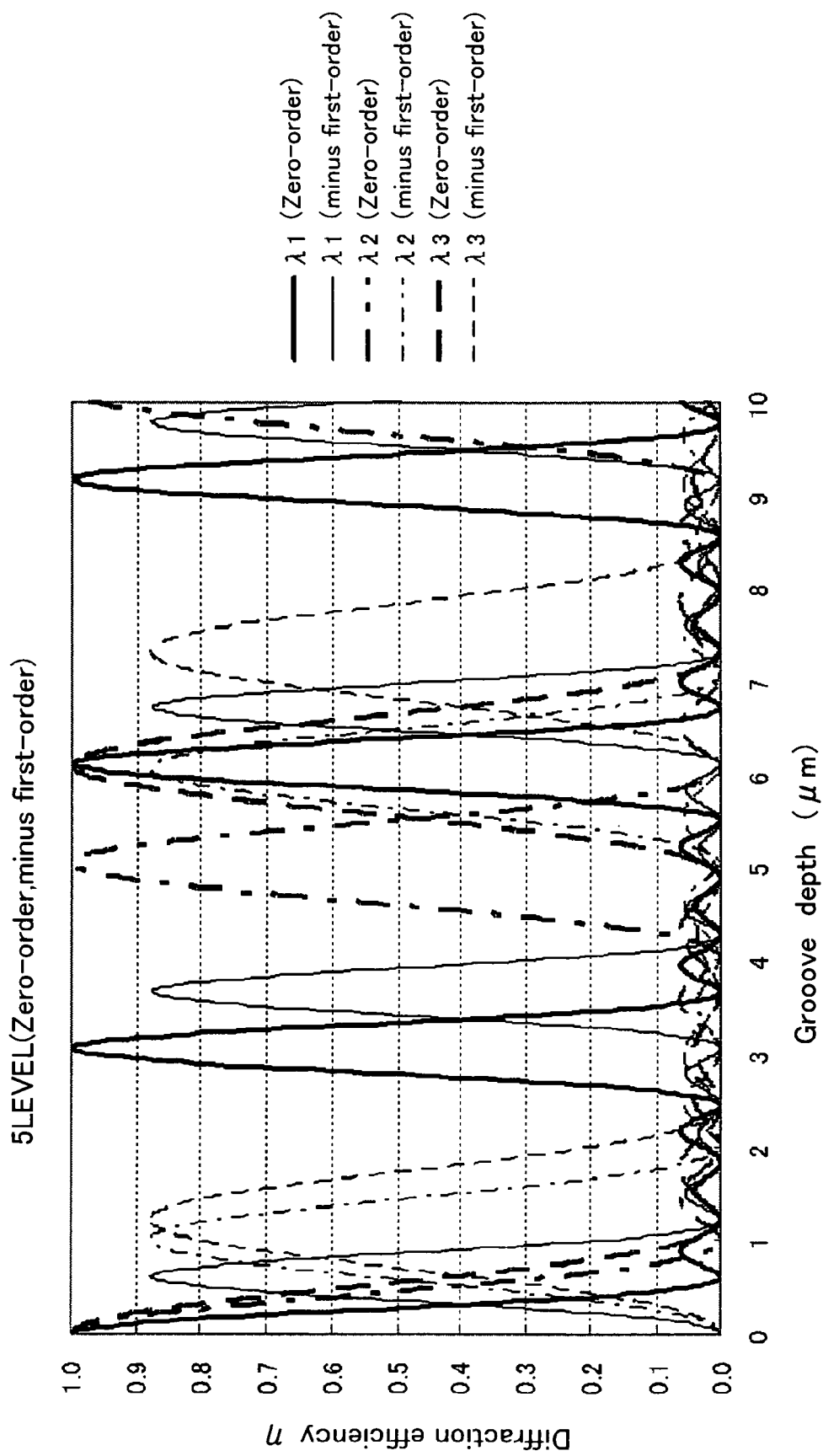
FIG. 9 is a graph representing the zero-order and the minus first-order diffraction efficiencies of the binary-blazed diffraction grating having the level number 5, according to Embodiment 1 of the invention.
Figure 15:
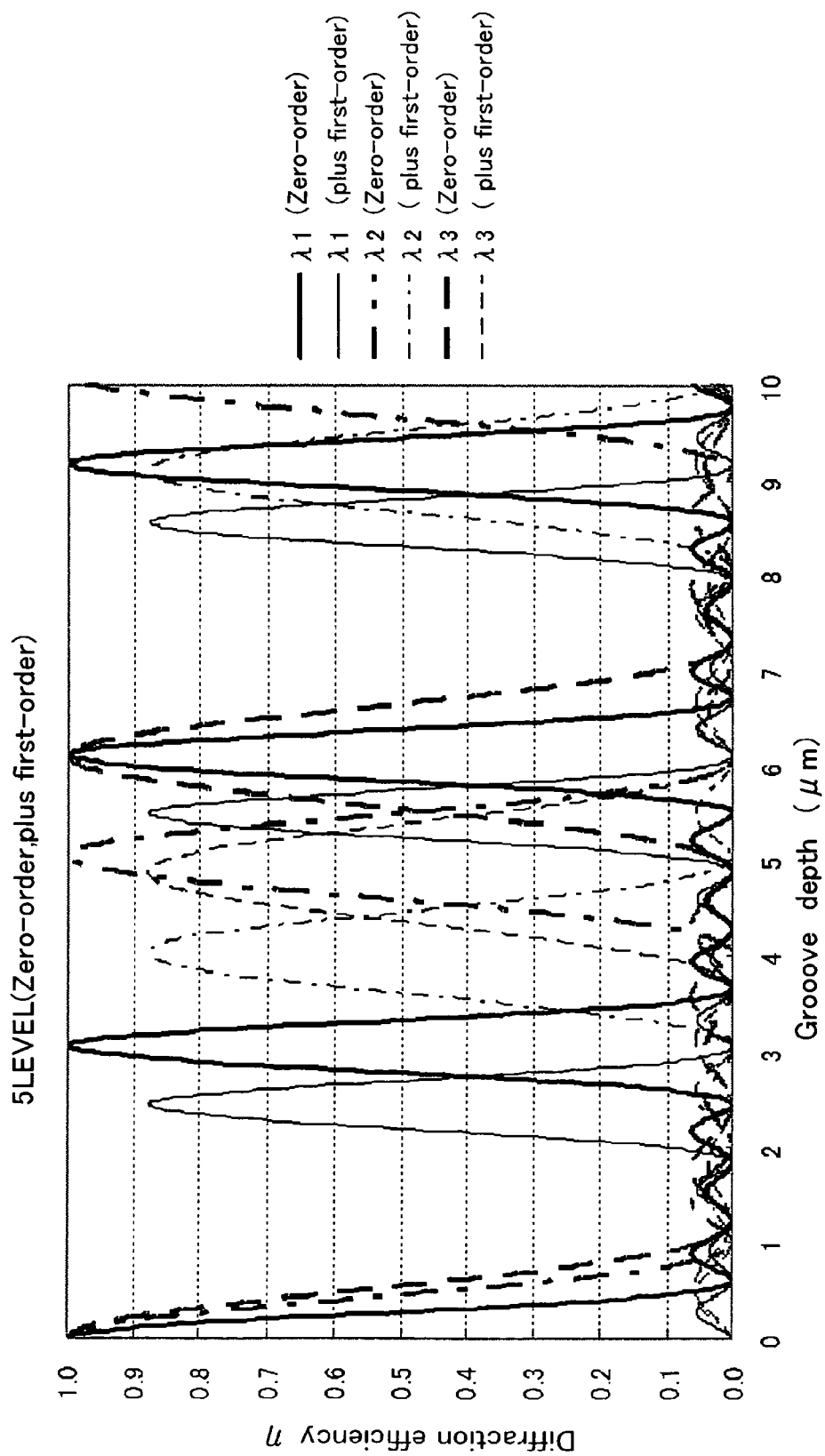
FIG. 15 is a graph representing the zero-order and the plus first-order diffraction efficiencies of the binary-blazed diffraction grating having the level number 5, according to Embodiment 1 of the invention.

As represented in FIG. 9 and FIG. 15, when the level number P=5, the zero-order diffracted light beams with the wavelengths of $\lambda_1$ and $\lambda_3$ each reach approximately the maximum value at the groove depth h of approximately 6.10 μm. Regarding the first-order diffraction efficiency η for the light beam with the wavelength $\lambda_2$ at this time, the minus-first-order-light diffraction efficiency η=0.872, while the plus-first-order-light diffraction efficiency η=0.

Figure 10:
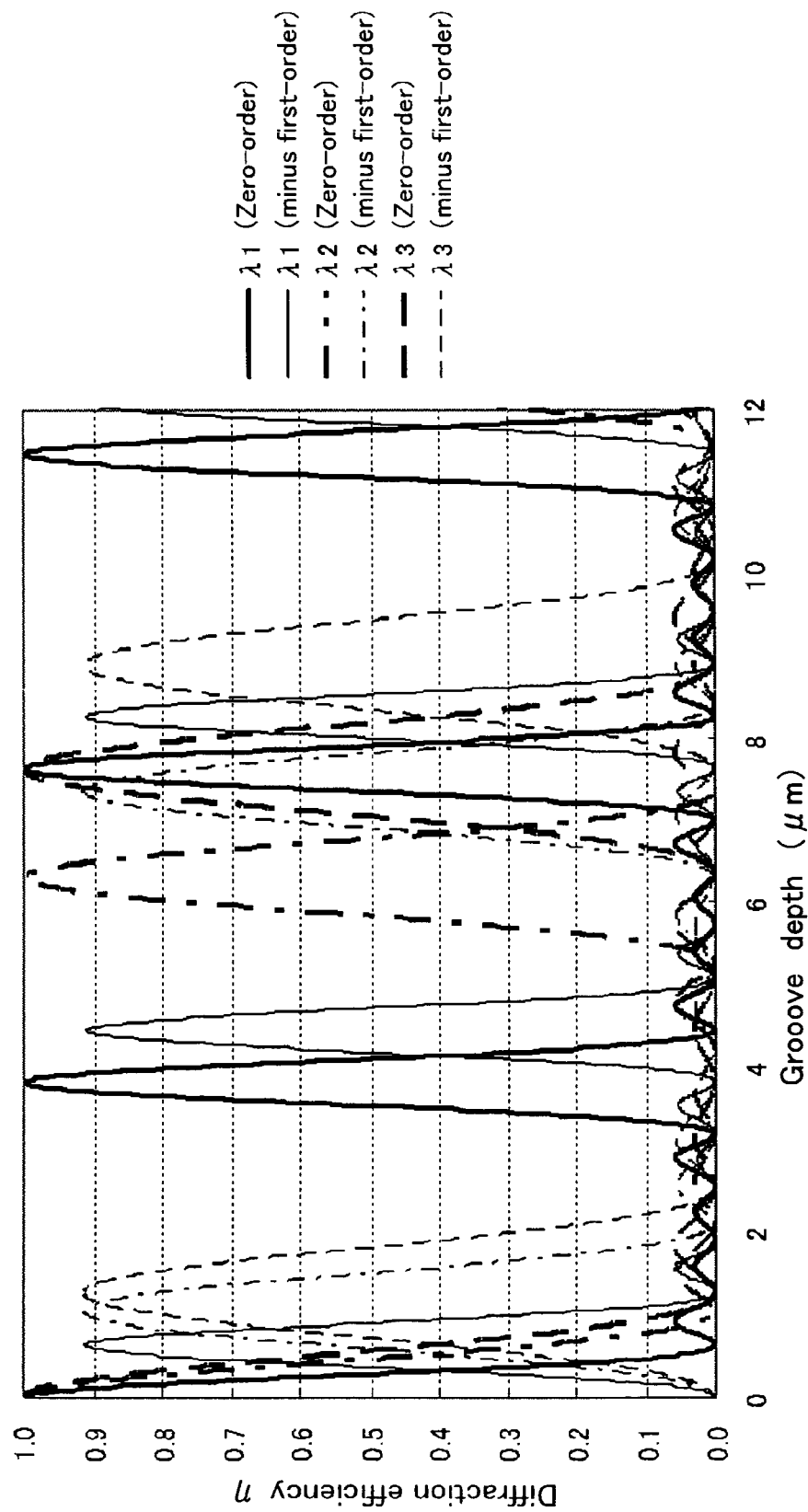
FIG. 10 is a graph representing the zero-order and the minus first-order diffraction efficiencies of the binary-blazed diffraction grating having the level number 6, according to Embodiment 1 of the invention.
Figure 16:
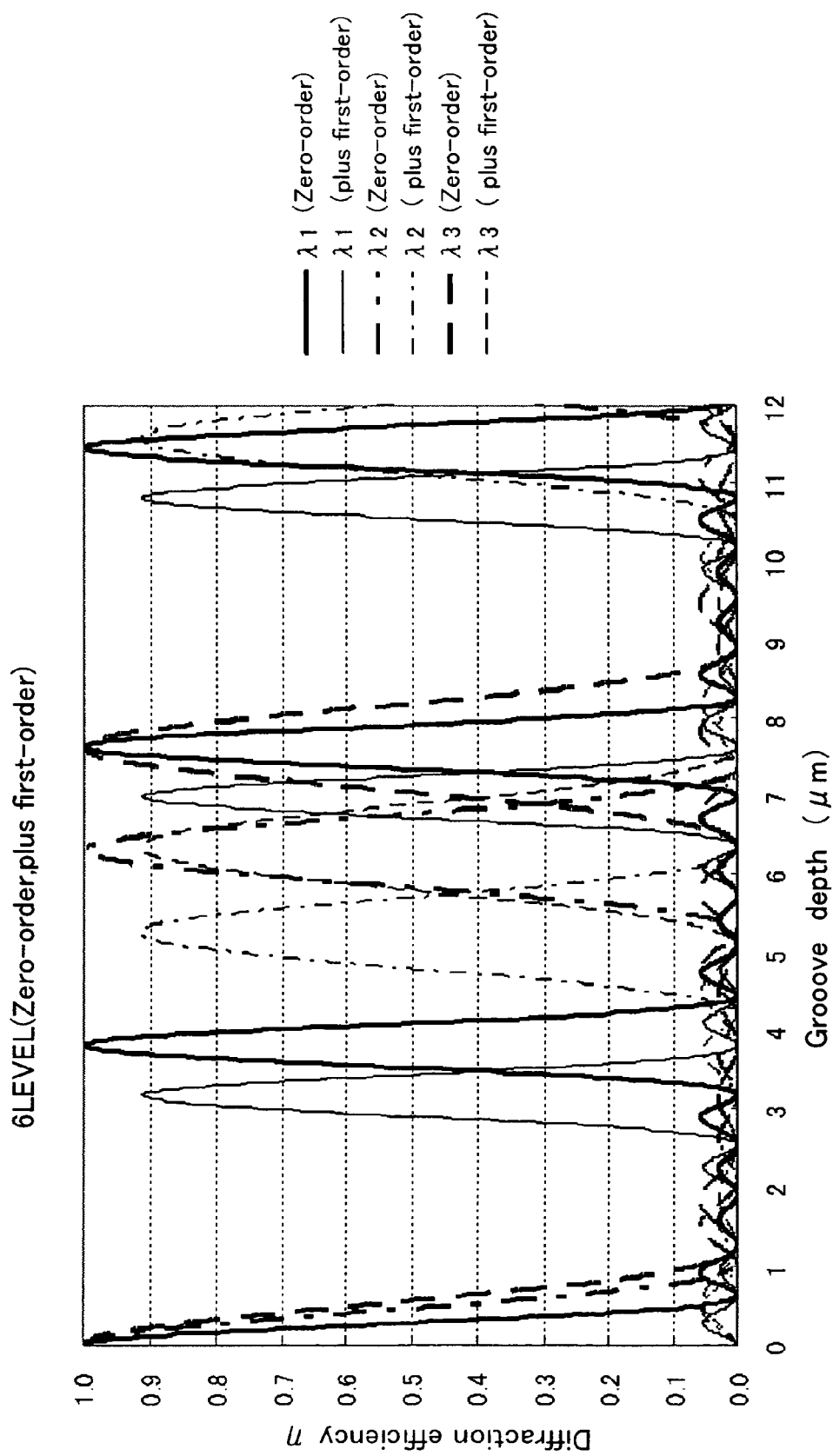
FIG. 16 is a graph representing the zero-order and the plus first-order diffraction efficiencies of the binary-blazed diffraction grating having the level number 6, according to Embodiment 1 of the invention.

As represented in FIG. 10 and FIG. 16, when the level number P=6, the zero-order diffracted light beams with the wavelengths of $\lambda_1$ and $\lambda_3$ each reach approximately the maximum value at the groove depth h of approximately 7.63 µm. Regarding the first-order diffraction efficiency η for the light beam with the wavelength $\lambda_2$ at this time, the minus-first-order-light diffraction efficiency η=0.746, while the plus-first-order-light diffraction efficiency η=0.015.

Figure 11:
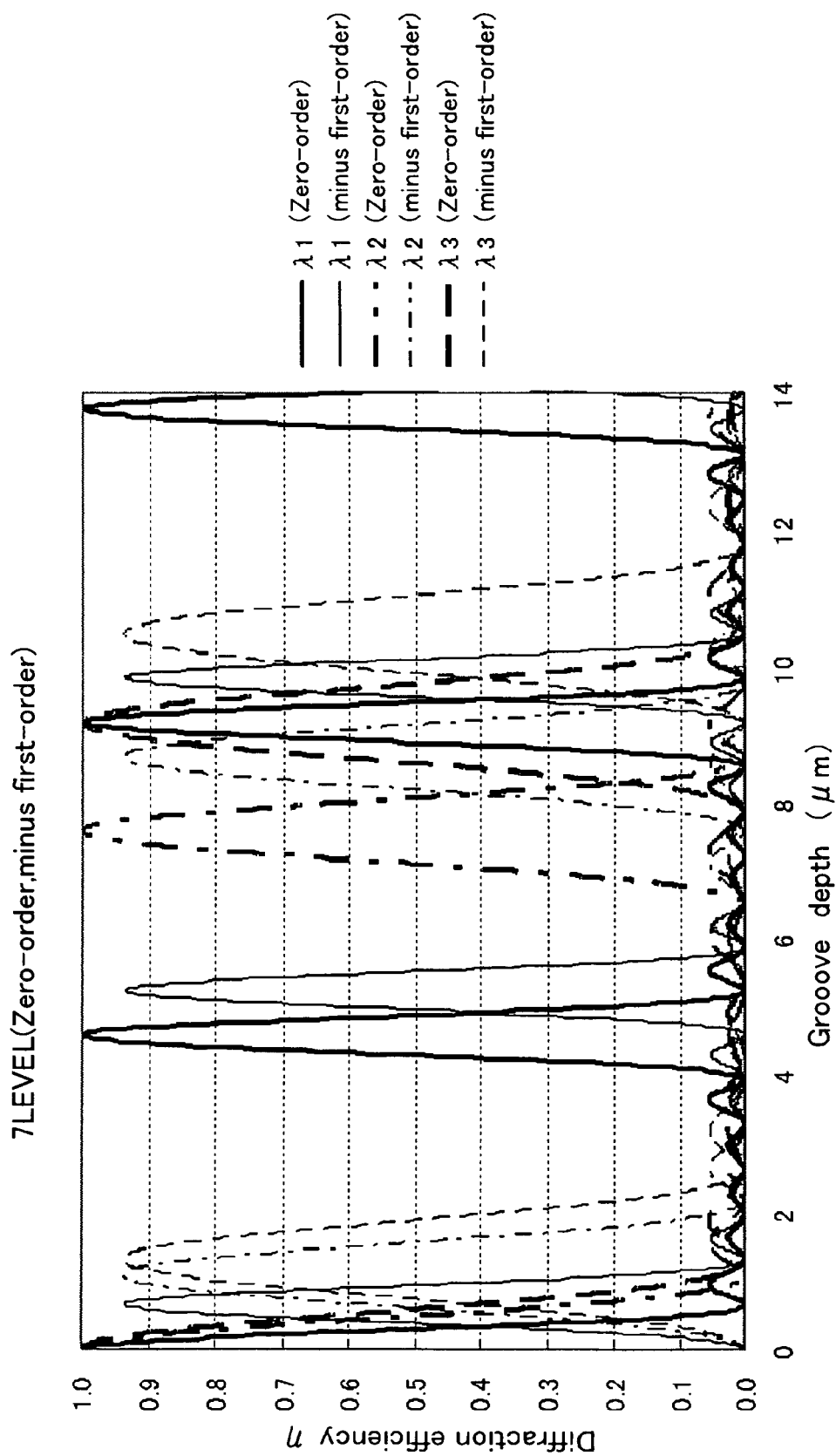
FIG. 11 is a graph representing the zero-order and the minus first-order diffraction efficiencies of the binary-blazed diffraction grating having the level number 7, according to Embodiment 1 of the invention.
Figure 17:
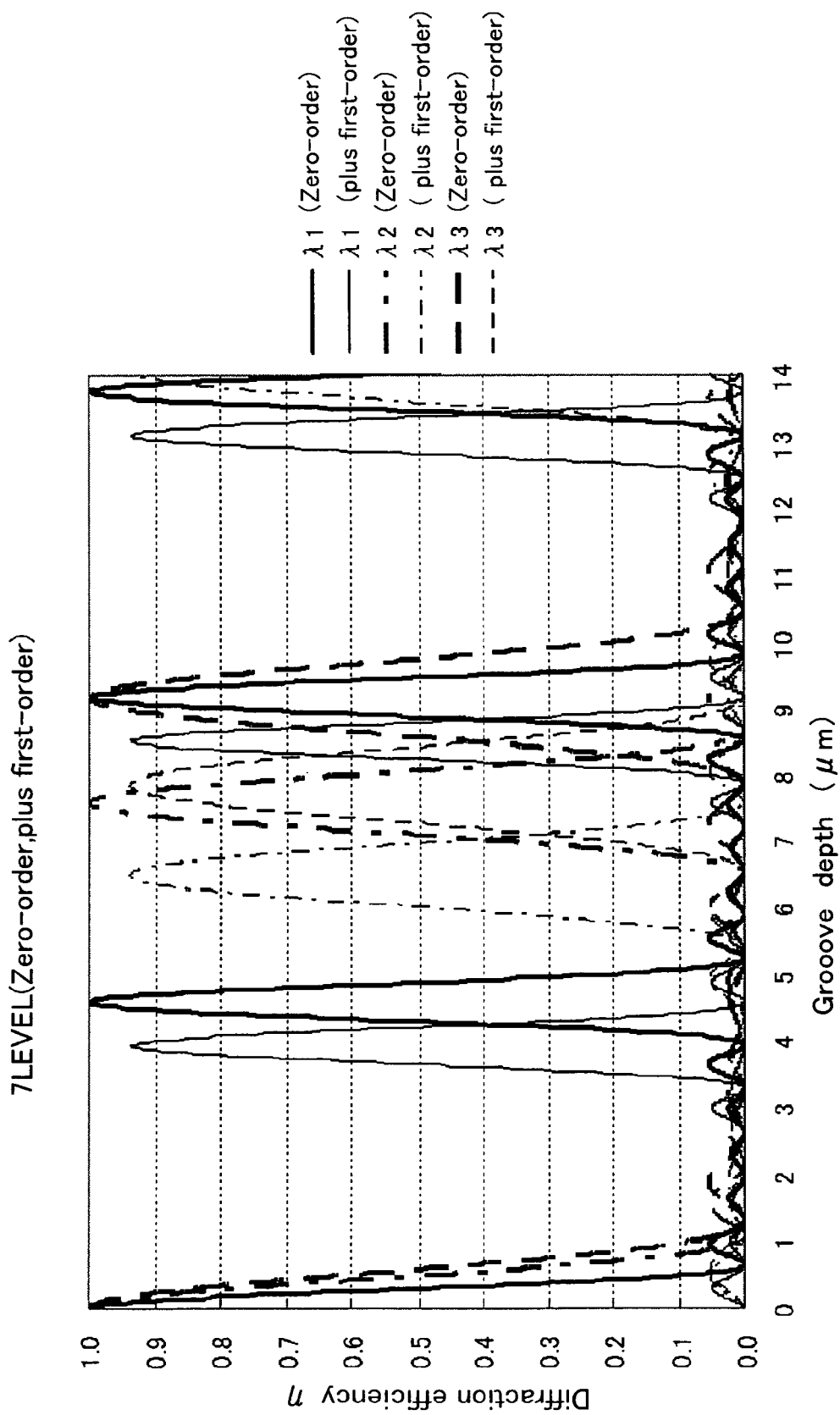
FIG. 17 is a graph representing the zero-order and the plus first-order diffraction efficiencies of the binary-blazed diffraction grating having the level number 7, according to Embodiment 1 of the invention.

As represented in FIG. 11 and FIG. 17, when the level number P=7, the zero-order diffracted light beams with the wavelengths of $\lambda_1$ and $\lambda_3$ each reach approximately the maximum value at the groove depth h of approximately 9.16 µm. Regarding the first-order diffraction efficiency η for the light beam with the wavelength $\lambda_2$ at this time, the minus-first-order-light diffraction efficiency η=0.448, while the plus-first-order-light diffraction efficiency η=0.024.

Figure 12:
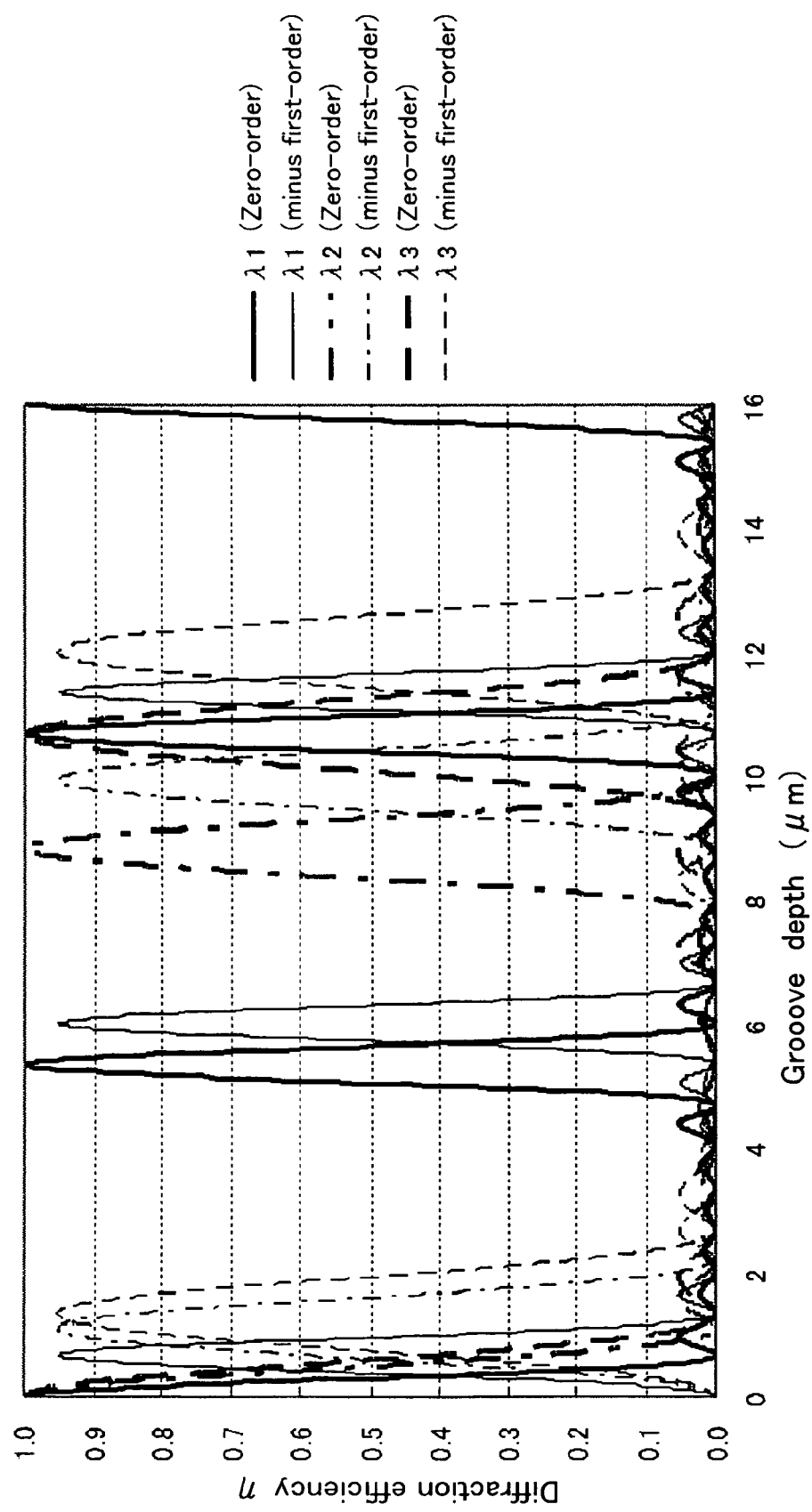
FIG. 12 is a graph representing the zero-order and the minus first-order diffraction efficiencies of the binary-blazed diffraction grating having the level number 8, according to Embodiment 1 of the invention.
Figure 18:
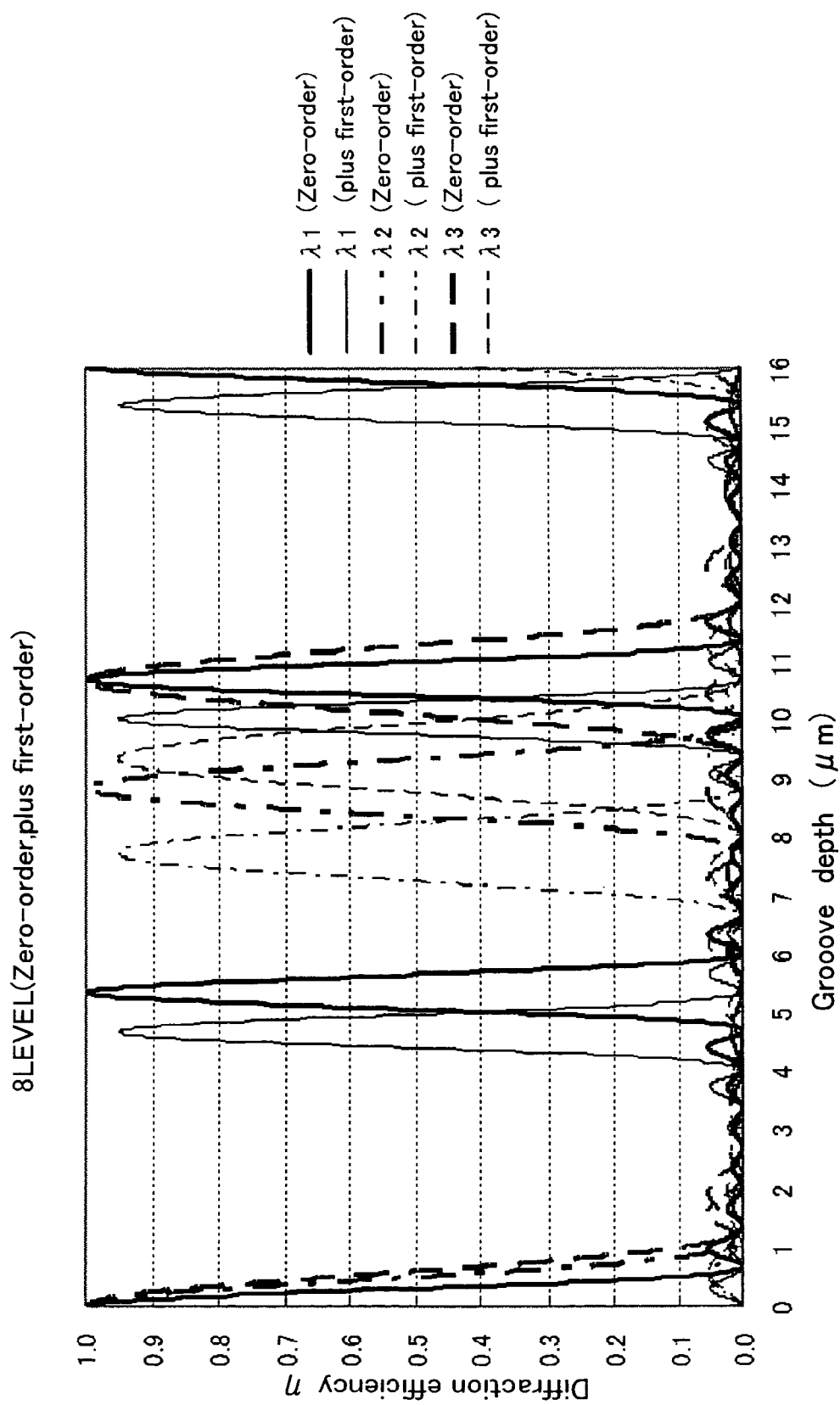
FIG. 18 is a graph representing the zero-order and the plus first-order diffraction efficiencies of the binary-blazed diffraction grating having the level number 8, according to Embodiment 1 of the invention.

As represented in FIG. 12 and FIG. 18, when the level number P=8, the zero-order diffracted light beams with the wavelengths of $\lambda_1$ and $\lambda_3$ each reach approximately the maximum value at the groove depth h of approximately 10.68 µm. Regarding the first-order diffraction efficiency η for the light beam with the wavelength $\lambda_2$ at this time, the minus-first-order-light diffraction efficiency η=0.172, while the plus-first-order-light diffraction efficiency η=0.015.

Figure 19:
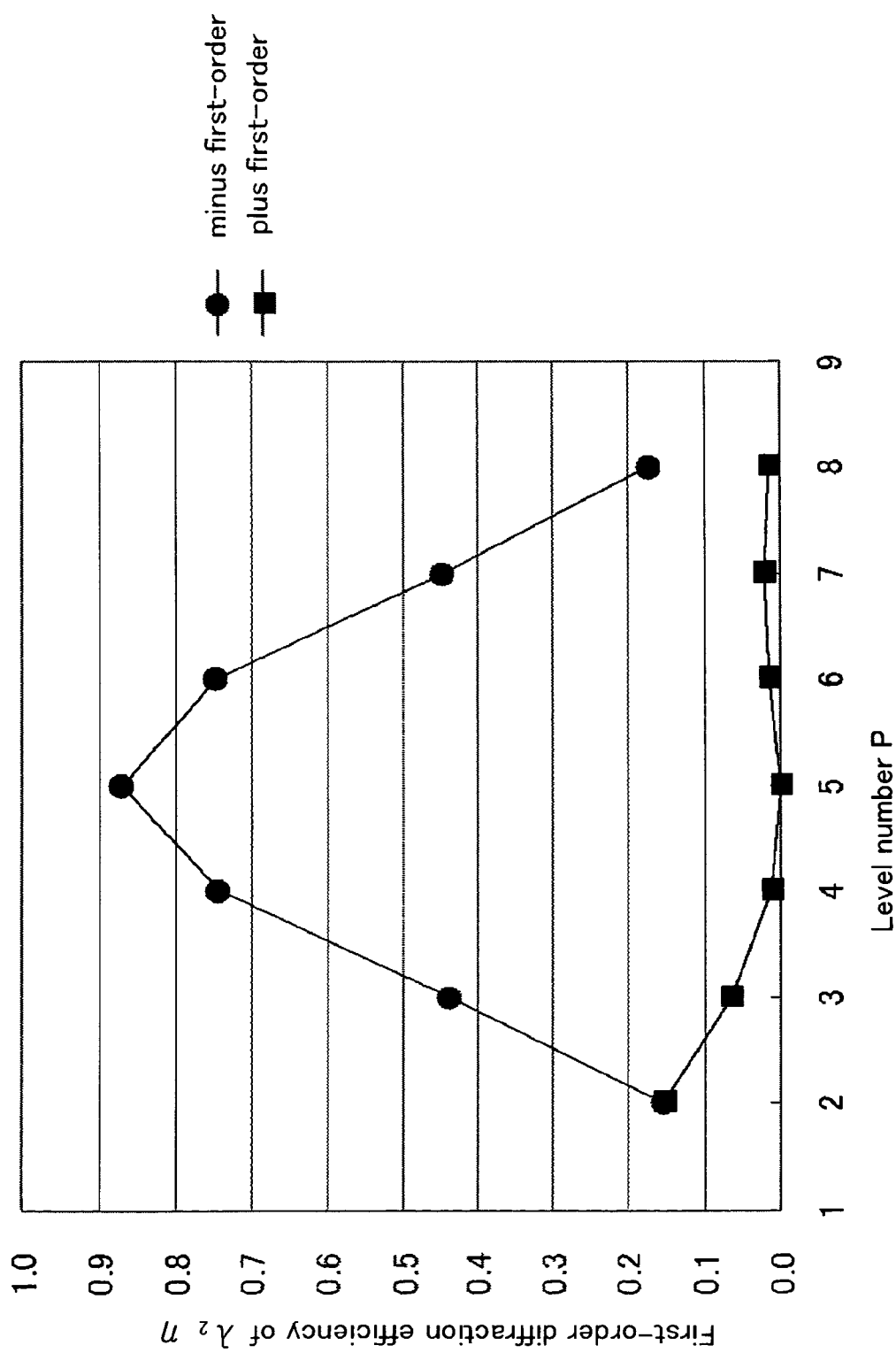
FIG. 19 is a graph representing the first-order diffraction efficiencies of a light beam whose wavelength is $\lambda_2$ at each level number according to Embodiment 1 of the invention.

FIG. 19 is a graph representing relationships between the level number P and the first-order diffraction efficiencies of the wavelength $\lambda_2$, when the efficiencies of the zero-order diffraction light beams with the wavelengths of $\lambda_1$ and $\lambda_3$ each reach approximately the maximum value.

Generally, as the light amount received by the photo-detector 14 increases, the signal detection becomes easier. In this embodiment, by setting the level number P to 5, a large value of the first-order diffraction light efficiency for the wavelength $\lambda_2$, has been obtained at a value of the groove depth h, when the efficiencies of the zero-order diffraction light beams with the wavelengths of $\lambda_1$ and $\lambda_3$ each reach approximately the maximum value. Accordingly, intensity of not only the return light beam whose wavelengths are $\lambda_1$ and $\lambda_3$ but also the return light beam whose wavelength is $\lambda_2$ increases; consequently, the signal detection can be favorably performed.

As explained above, in this embodiment, by controlling, using the adjusting element 13 for optical axes, the optical axis of at least one of the return light beams with the wavelengths of $\lambda_1$, $\lambda_2$, and $\lambda_3$ having been reflected on the optical recording medium, the return light beams with the respective wavelengths can be detected by the common photo-detector 14. Accordingly, downsizing and low-cost manufacturing of an optical pickup device and an optical disc device using it can be realized.

In this embodiment, because the zero-order diffracted light of the return light beams with the wavelengths of $\lambda_1$, and $\lambda_3$ is configured to be guided to the photo-detector 14, without varying the light receiving position, on the photo-detector 14, of the return light beams with the wavelengths of $\lambda_1$, and $\lambda_3$, by controlling the position of the diffraction grating 13 or the photo-detector 14 along the optical axis, the light receiving position of the return light beam with the wavelength $\lambda_2$ can be made coincident with the light receiving position, on the photo-detector 14, of the return light beams with the wavelengths of $\lambda_1$ and $\lambda_3$. Accordingly, the optical axis can be controlled by a simple control method to guide the return light beams with the wavelengths of $\lambda_1$, $\lambda_2$, and $\lambda_3$ into the common photo-detector 14.

In this embodiment, the zero-order diffracted light beams with the wavelengths of $\lambda_1$ and $\lambda_3$ are used; however, as represented in FIG. 6 through FIG. 18, without forming the groove depth h of the diffraction grating to be quite deep, the zero-order diffraction of the light beams with the wavelengths of $\lambda_1$ and $\lambda_3$ can be obtained at high efficiency. Therefore, a diffraction grating by which the zero-order diffraction of the light beams with the wavelengths of $\lambda_1$ and $\lambda_3$ can be obtained at the high efficiency can be easily created.

Moreover, in the binary-blazed diffraction grating, when the step height d is an integral multiple of $\lambda/(n-1)$, the difference of the optical path lengths depending on the step height d becomes an integral multiple of the wavelength λ; consequently, the maximum value of the zero-order diffraction efficiency can be obtained. In this embodiment, the step height d of the diffraction grating is set to $d \approx m\lambda_3/(n_3-1)$, in which the maximum value of the zero-order diffraction efficiency can be obtained at the wavelength of $\lambda_3$. Assuming that the wavelength $\lambda_1$ is 405 nm, and the wavelength $\lambda_3$ is 780 nm, the ratio of the wavelengths approximately equals to 1.92, which is close to 2. Therefore, if the step height d is set so that the difference of the optical path lengths becomes an integral multiple of the wavelength $\lambda_3$, the difference also becomes almost an integral multiple of the wavelength $\lambda_1$; consequently, high efficiencies of the zero-order diffraction can also be obtained for both the wavelengths of $\lambda_1$ and $\lambda_3$. As a result, signal detection can be favorably performed for the return light beams with the wavelengths of $\lambda_1$ and $\lambda_3$.

Embodiment 2

Figure 20:
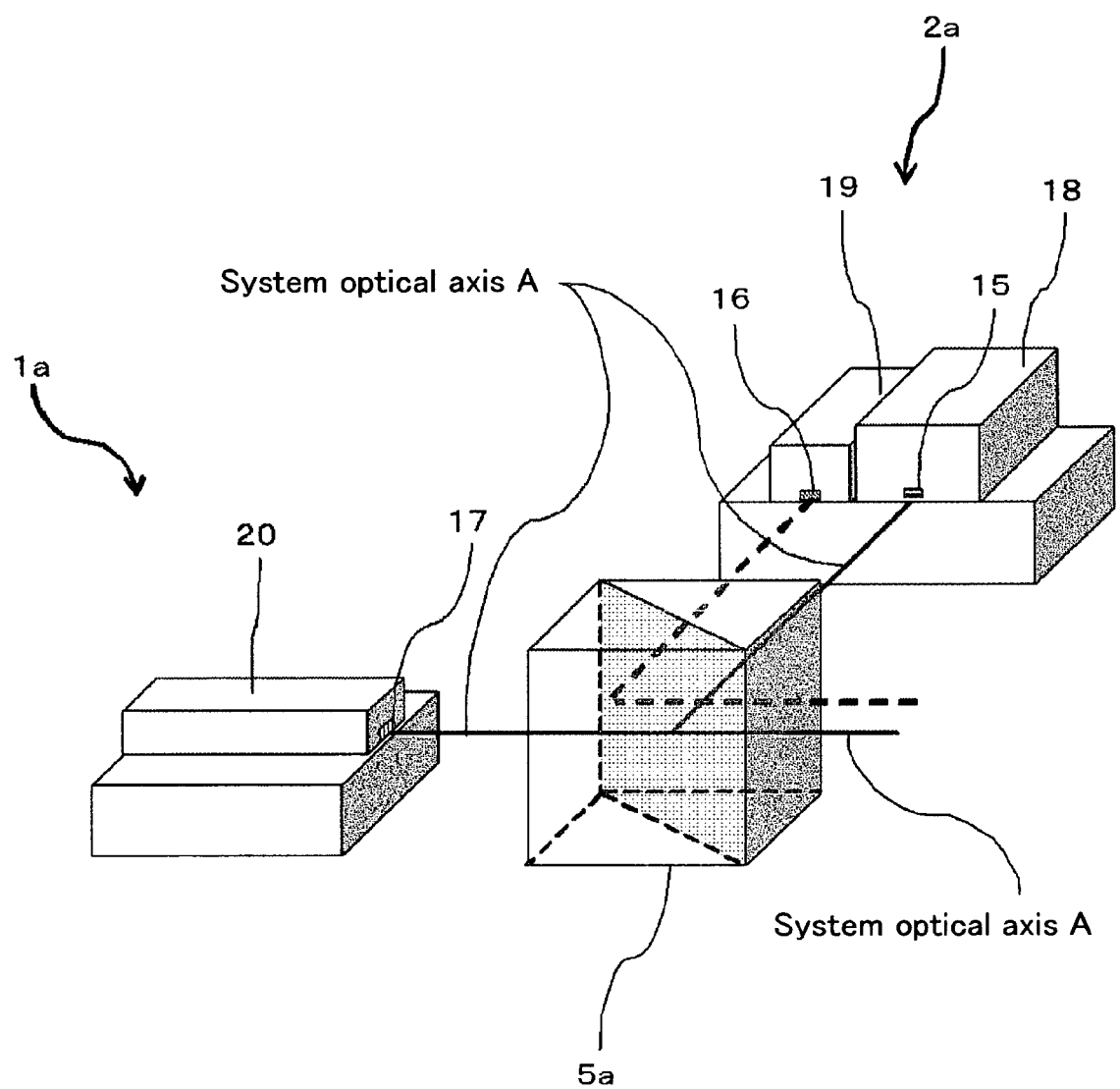
FIG. 20 is a view illustrating a relationship between light emitting portions and system optical axes according to Embodiment 2 of the invention.

FIG. 20 is a view illustrating relationships between system optical axes A and optical axes of light beams emitted from respective light emitting portions in laser output units according to Embodiment 2 of the invention. Here, relationships between the light emitting portions and the respective optical axes are represented, in which neither the appearances of the laser output units nor a grating is drawn. According to this embodiment, the constitution of a semiconductor substrate included in each laser output unit is different from that in Embodiment 1. The constitutional elements with the numerals not smaller than 6 that denotes the prism included in an optical pickup device according to this embodiment are configured similarly to those in Embodiment 1 described above.

As the configurations of the laser output units according to this embodiment, the semiconductor substrate 20, on which the light emitting portion 17 that emits light beam whose wavelength is $\lambda_3$ (approximately 780 nm) is formed, is included in a laser output unit 1a, and the semiconductor substrates 18 and 19, on which the light emitting portions 15 and 16 that emit light beams whose wavelengths are $\lambda_1$ (approximately 405 nm) and $\lambda_2$ (approximately 650 nm) are formed, respectively, are included in a laser output unit 2a; by applying voltage to each of the light emitting portions 15, 16, and 17 that are formed on the semiconductor substrates, the light beams having the respective wavelengths of $\lambda_1$, $\lambda_2$, and $\lambda_3$ are configured to be emitted. In FIG. 20, the semiconductor substrates 18 and 19 are separate ones; however, the semiconductor substrates may be configured to be formed as a unit, that is, a monolithic-type semiconductor substrate may also be used.

According to this embodiment, the light emitting portion 15 for the wavelength $\lambda_1$ is arranged in such a way that its optical axis coincides with the system optical axis A of the optical pickup device. The light emitting portion 16 for the wavelength $\lambda_2$ is arranged, due to spatial limitation, at a position slightly apart from the light emitting portion 15 for the wavelength $\lambda_1$. The light emitting portion 17 for the wavelength $\lambda_3$ is arranged in such a way that its optical axis coincides with the system optical axis A of the optical pickup device. Here, the wavelength $\lambda_1$ and the wavelength $\lambda_2$ are used after having been reflected by the mirror surface of a dichroic mirror 5a, while the wavelength $\lambda_3$ is used after having passed through it.

Figure 21:
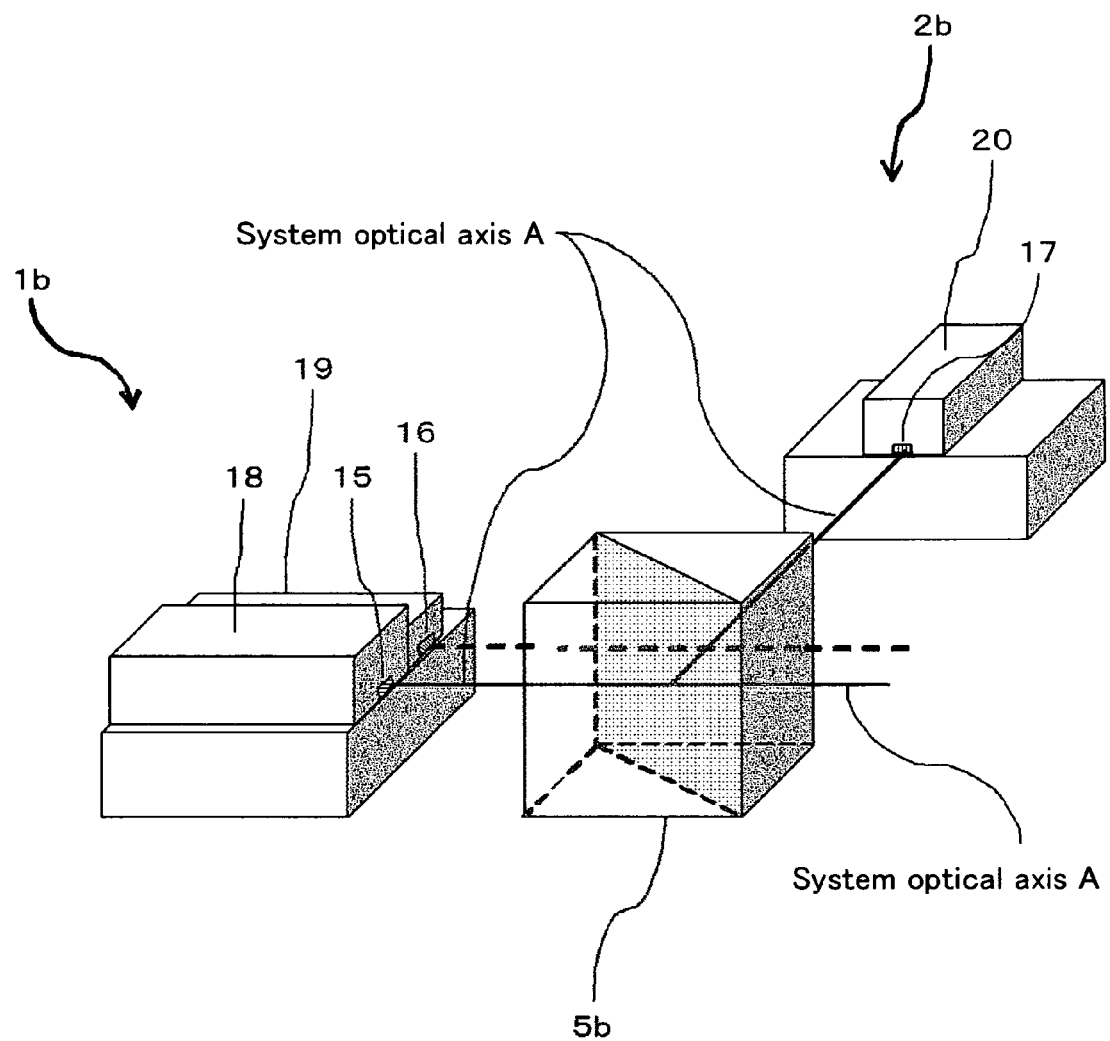
FIG. 21 is a view illustrating another example of a relationship between light emitting portions and system optical axes according to Embodiment 2 of the invention.

FIG. 21 is a view illustrating another example representing relationships between system optical axes A and optical axes of light emitting portions in laser output units according to Embodiment 2 of the invention. Here, relationships between the light emitting portions and respective optical axes are represented, in which neither the appearances of the laser output units nor a grating is drawn. According to this embodiment, the constitution of a semiconductor substrate included in each laser output unit is different from that in Embodiment 1. The constitutional elements with the numerals not smaller than 6 that denotes the prism included in an optical pickup device according to this embodiment are configured similarly to those in Embodiment 1 described above.

As the configurations of the laser output units according to this embodiment, the semiconductor substrates 18 and 19, on which the light emitting portions 15 and 16 that emit light beams whose wavelengths are $\lambda_1$ (approximately 405 nm) and $\lambda_2$ (approximately 650 nm) are formed, respectively, are included in a laser output unit 1b, and the semiconductor substrate 20, on which the light emitting portion 17 that emits light beam whose wavelength is $\lambda_3$ (approximately 780 nm) is formed, is included in a laser output unit 2b; by applying a voltage to each of the light emitting portions 15, 16, and 17 that are formed on the semiconductor substrates, the light beams having the respective wavelengths of $\lambda_1$, $\lambda_2$, and $\lambda_3$ are configured to be emitted. In FIG. 21, the semiconductor substrates 18 and 19 are separate ones; however, the semiconductor substrates may be configured to be formed as a unit, that is, a monolithic-type one may also be used.

According to this embodiment, the light emitting portion 15 for the wavelength $\lambda_1$ is arranged in such a way that its optical axis coincides with the system optical axis A of the optical pickup device. The light emitting portion 16 for the wavelength $\lambda_2$ is arranged, due to spatial limitation, at a position slightly apart from the light emitting portion 15 for the wavelength $\lambda_3$. The light emitting portion 17 for the wavelength $\lambda_3$ is arranged in such a way that its optical axis coincides with the system optical axis A of the optical pickup device. Here, the wavelength $\lambda_1$ and the wavelength $\lambda_2$ are used after having passed through the mirror surface of a dichroic mirror 5b, while the wavelength $\lambda_3$ is used after having been reflected thereby.

Figure 22:
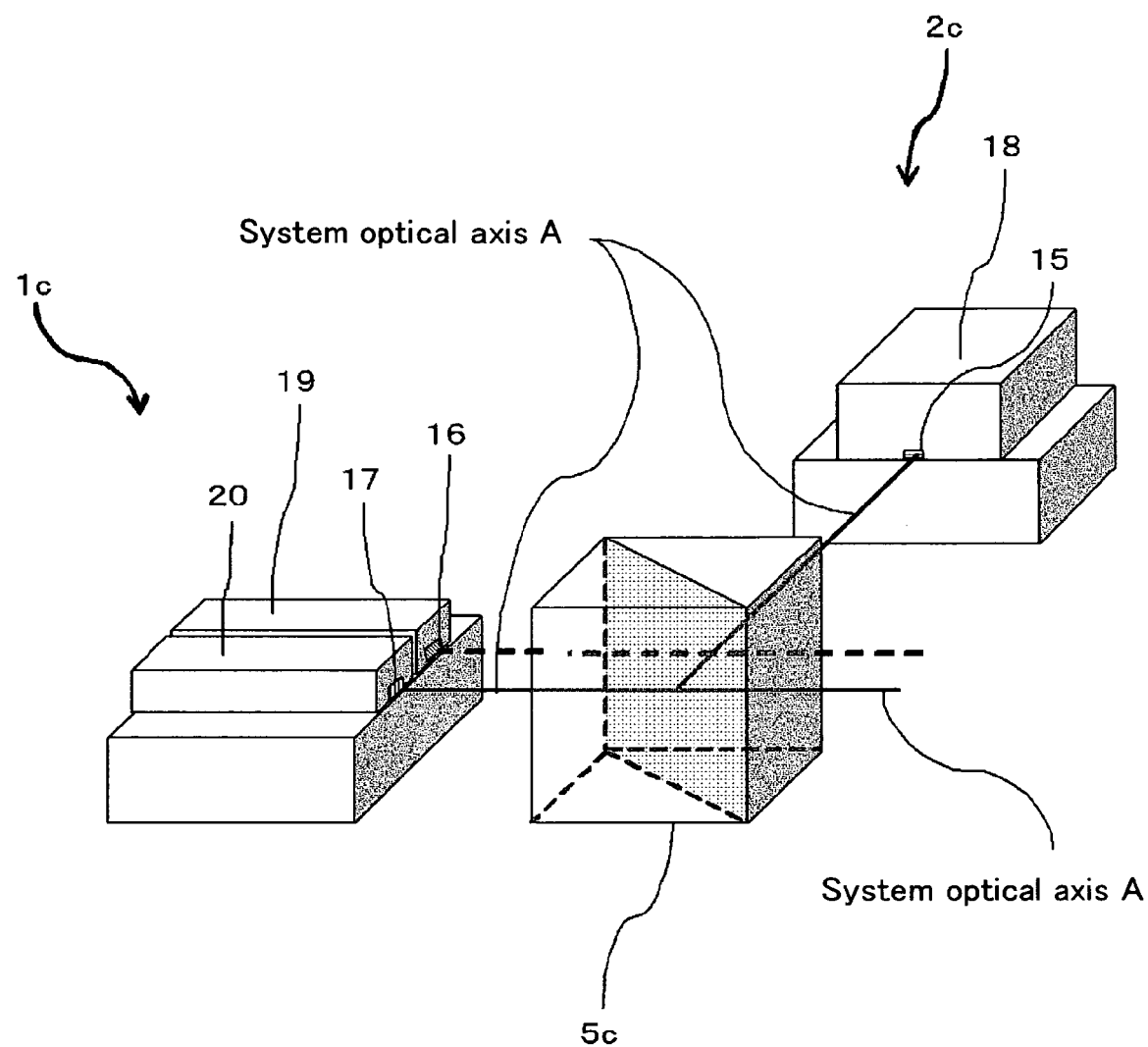
FIG. 22 is a view illustrating still another example of a relationship between light emitting portions and system optical axes according to Embodiment 2 of the invention.

FIG. 22 is a view illustrating another example representing relationships between system optical axes A and optical axes of light beams emitted from respective light emitting portions in laser output units according to Embodiment 2 of the invention. Here, relationships between the light emitting portions and respective optical axes are represented, in which neither the appearance of the laser output unit nor a grating is drawn. According to this embodiment, the constitution of a semiconductor substrate included in each laser output unit is different from that in Embodiment 1. The constitutional elements with the numerals being not smaller than 6 that denotes the prism included in an optical pickup device according to this embodiment are configured similar to those in Embodiment 1 described above.

As the configurations of the laser output units according to this embodiment, the semiconductor substrates 19 and 20, on which the light emitting portions 16 and 17 that emit light beams whose wavelengths are $\lambda_2$ (approximately 650 nm) and $\lambda_3$ (approximately 780 nm) are formed, respectively, are included in a laser output unit 1c, and the semiconductor substrate 18, on which the light emitting portion 15 that emits light beam whose wavelength is $\lambda_1$ (approximately 405 nm) is formed, is included in a laser output unit 2c; by applying a voltage to each of the light emitting portions 15, 16, and 17 that are formed on the semiconductor substrates, the light beams having the respective wavelengths of $\lambda_1$, $\lambda_2$, and $\lambda_3$ are configured to be emitted. In FIG. 22, the semiconductor substrates 16 and 17 are separate ones; however, the semiconductor substrates may be configured to be formed as a unit, that is, a monolithic-type one may also be used.

According to this embodiment, the light emitting portion 15 for the wavelength $\lambda_1$ is arranged in such a way that its optical axis coincides with the system optical axis A of the optical pickup device. The light emitting portion 17 for the wavelength $\lambda_3$ is arranged in such a way that its optical axis coincides with the system optical axis A of the optical pickup device, and the light emitting portion 16 for the wavelength $\lambda_2$ is arranged, due to spatial limitation, at a position slightly apart from the light emitting portion 17 for the wavelength $\lambda_3$. Here, the wavelength $\lambda_2$ and the wavelength $\lambda_3$ are used after having passed through the mirror surface of a dichroic mirror 5c, while the wavelength $\lambda_1$ is used after having been reflected thereby.

According to this embodiment (as in FIG. 20, FIG. 21, and FIG. 22), each laser output unit is arranged in such a way that the optical axis of the light beam emitted from the light emitting portion 15 for the wavelength $\lambda_1$ coincides with that emitted from the light emitting portion 17 for the wavelength $\lambda_3$; therefore, similar effect to that described in Embodiment 1 can be obtained.

Embodiment 3

Although, in Embodiment 1 described above, the level number P of the diffraction grating 21 included in the adjusting element for optical axes has been set to 5, the level number P of the diffraction grating 21 in this embodiment is set within the range from 4 to 6. The other configurations of an optical pickup device according to this embodiment are similar to those in Embodiment 1 described above.

The configuration of the diffraction grating 21 represented in FIG. 5 described above corresponds to that of a case in which the level number P in this embodiment is set to 5. When, in the diffraction grating whose level number P is any one of 2 through 8, the groove depth h is varied, the zero-order and the first-order diffraction efficiencies for each wavelength vary as represented in FIG. 6 through FIG. 18. Moreover, the relationship between the level number P and the first-order diffraction efficiency for the wavelength $\lambda_2$ at the groove depth h, when the zero-order diffraction efficiencies for the wavelengths $\lambda_1$ and $\lambda_3$ become approximately the maximums, has been found in FIG. 19. Here, as described in Embodiment 1, the refractive index of the diffraction grating 21 is calculated using the refractive-index data corresponding to BK7 as general glass material.

As represented in FIG. 19, if the level number P of the diffraction grating 21 is within the range from 4 to 6, the first-order diffraction efficiency for the wavelength $\lambda_2$ at the groove depth h is not lower than 0.7 when the zero-order diffraction efficiencies for the wavelengths $\lambda_1$ and $\lambda_3$ become the maximums; accordingly, a relatively high first-order diffraction efficiency can be obtained. Generally, because, as the light intensity received by the photo-detector increases, the signal detection becomes easier, if the level number P of the diffraction grating is from 4 to 6, favorable signal detection can be performed by the photo-detector.

As explained above, in this embodiment, by using the binary-blazed diffraction grating whose level number P is from 4 to 6, the relatively high diffraction efficiency can also be obtained for the return light beam having the wavelength of $\lambda_2$, in addition to that for the return light beams having the respective wavelengths of $\lambda_1$ and $\lambda_3$; thereby, the favorable signal detection can be performed by the photo-detector 14.

Especially, when the level number P is set to 4, the step number is smaller and the structure is simpler than those in a case of the level number P being 5 or 6; therefore, an advantage is also be obtained that the diffraction grating 21 can easily produced.

Embodiment 4

In Embodiment 1 described above, the refractive index of the diffraction grating 21 included in the adjusting element 13 for optical axes is assumed to be equivalent to that of BK7 as general glass material; however, in this embodiment, material having the refractive index that satisfies the following condition is selected as that of the diffraction grating 21. The other configurations of an optical pickup device according to this embodiment are similar to those in Embodiment 1 described above.

According to this embodiment, a material of the diffraction grating 21 included in the adjusting element 13 for optical axes is selected among materials in which a relationship $$1.0 \leq (n_1-1)/(n_3-1) \leq 1.08 \qquad \text{Eq.2}$$

is satisfied, where the refractive indexes of the material for the wavelengths $\lambda_1$ and $\lambda_3$ are $n_1$ and $n_3$, respectively.

In Embodiment 1 described above, it has been described that the wavelengths of $\lambda_1$ and $\lambda_3$ are approximately 405 nm and 780 nm, respectively; however, generally the wavelengths outputted from the blue-violet semiconductor laser output unit and the CD laser output unit vary with certain margins, for example, $\lambda_1 = 405 \pm 8$ nm, and $\lambda_3 = 780 \pm 15$ nm; therefore, it is not necessary that $\lambda_1 = 405$ nm, and $\lambda_3 = 780$ nm.

As explained also in Embodiment 1, when the step height d of the diffraction grating 21 is an integral multiple of $\lambda/(n-1)$, the maximum zero-order diffraction efficiency can be obtained; therefore, the most suitable step height d for the wavelength $\lambda_1$ is an integral multiple of $\lambda_1/(n_1-1)$, and the most suitable step height d for the wavelength $\lambda_3$ is an integral multiple of $\lambda_3/(n_3-1)$. The value of $\lambda_3/\lambda_1$ is approximately "2"; however, considering the difference between the refractive indexes $n_1$ and $n_3$, when a relationship $$2\lambda_1/(n_1-1) = \lambda_3/(n_3-1) \qquad \text{Eq. 3}$$

is established, the maximum zero-order diffraction efficiencies for the wavelengths $\lambda_1$ and $\lambda_3$ can be simultaneously obtained. By modifying Equation 3, the following Equation 4

$$(n_1-1)/(n_3-1) = 2\lambda_1/\lambda_3 \qquad \text{Eq. 4}$$

can be obtained.

When the outputted-wavelength ranges described above are applied to Equation 4, Equation 2 described above can be obtained. If the diffraction grating 21 is formed using material that satisfies Equation 2, the maximum zero-order diffraction efficiencies for both the wavelengths $\lambda_1$ and $\lambda_3$ can be obtained at the same step height d. Therefore, by selecting suitable material for the diffraction grating 21 corresponding to the wavelengths outputted from the laser output units used, relatively high zero-order diffraction efficiencies can be simultaneously obtained for the wavelengths $\lambda_1$ and $\lambda_3$.

As explained above, in this embodiment, even in a case where the laser output units are used by which the light beams having the wavelengths with certain margins are outputted, by selecting, from material by which the relationship of $1.0 \leq (n_1-1)/(n_3-1) \leq 1.08$ is satisfied in the binary-blazed diffraction grating 21, specified material adapted to the wavelengths outputted from the laser output unit, relatively high zero-order diffraction efficiencies can be obtained for both of the wavelengths $\lambda_1$ and $\lambda_3$; therefore, signals can be favorably detected by the photo-detector 14.

Embodiment 5

Figure 23:
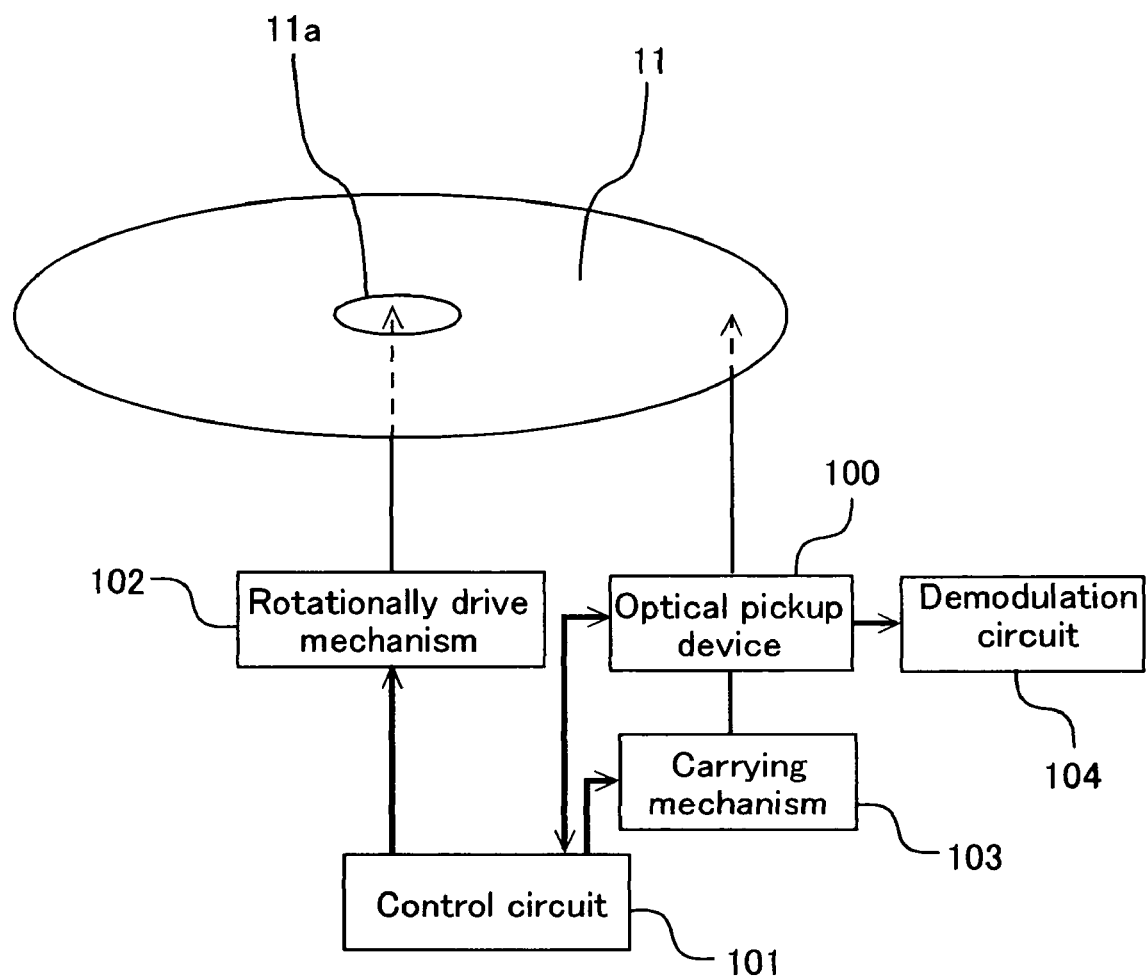
FIG. 23 is a diagram representing a basic configuration of an optical disc device according to Embodiment 5 of the invention.

FIG. 23 is a diagram representing a basic configuration of an optical disc device according to Embodiment 5 of the invention. The optical disc device according to this embodiment includes an optical pickup device 100, in which any one of the optical pickup devices represented in Embodiments 1 through 4 may also be used as the optical pickup device 100. The optical disc device according to this embodiment is provided with a rotationally drive mechanism 102 for supporting and rotationally driving a DVD, a CD, or a blue-violet laser optical disc having capacity several times larger than that of them. The rotationally drive mechanism 102 positions the optical disc 11 with a chucking hole 11*a* provided at the center thereof being used as a reference, and rotationally drives.

The optical pickup device 100 is arranged in a state in which an objective lens is faced to the signal recording face of the optical disc 11 rotationally driven by the rotationally drive mechanism 102, and moved in the radial direction of the optical disc by a carrying mechanism 103. The optical pickup device 100, the rotationally drive mechanism 102, and the carrying mechanism 103 are controlled by a control circuit 101. By the optical pickup device 100, information is at least either recorded onto or reproduced from the optical disc 11, using a light beam having a wavelength, selected corresponding to the kind of an optical disc, among three kinds of wavelengths $\lambda_1, \lambda_2,$ and $\lambda_3$ that the laser output unit can emit. Signals read out from the optical disc by the optical pickup device 100 are demodulated by a demodulation circuit 104.

According to this embodiment, by using the optical pickup devices explained in Embodiments 1 through 4, downsizing of optical disc devices and their cost reduction can be realized.

Here, in each embodiment described above, the wavelengths $\lambda_1, \lambda_2,$ and $\lambda_3$ have been set to approximately 405 nm, 650 nm, and 780 nm, respectively; however, a combination of other wavelengths may be used corresponding to the kind of the used optical recording medium. For example, if one of the wavelengths among three wavelengths $\lambda_1, \lambda_2,$ and $\lambda_3$ approximately equals to an integral multiple of one of the two other wavelengths, similar effect can be obtained by an optical-system configuration similar to those in Embodiments 1 through 4.

Moreover, in an optical pickup device by which four light beams having wavelengths $\lambda_1, \lambda_2, \lambda_3,$ and $\lambda_4$, respectively, can be switched, for example, when both of $(\lambda_1/\lambda_2)$ and $(\lambda_1/\lambda_3)$ are approximately natural numbers, if all optical axes of the light beams of $\lambda_1, \lambda_2,$ and $\lambda_3$ can be made coincident with the system optical axes A, similar effect can be obtained by an optical-system configuration similar to that in each embodiment of the invention. All optical axes of the light beams of $\lambda_1, \lambda_2,$ and $\lambda_3$ can be made coincident with the system optical axes A, for example, by a method using two dichroic mirrors.

Moreover, in each embodiment described above, the binary-blazed diffraction grating 21 has been used; however, not limited to the binary-blazed diffraction grating, a adjusting element for optical axes may be used by which the optical axis of at least one of the return light beams can be controlled

The invention claimed is:

1. An optical pickup device for recording/reproducing information to/from an optical recording media, the optical pickup device comprising:
   a first light emitting portion that emits a first light beam with a first wavelength;
   a second light emitting portion that emits a second light beam with a second wavelength;
   a third light emitting portion that emits a third light beam with a third wavelength;
   an adjusting element that controls the optical axis of the return light beam of said second light beam reflected by said optical recording media, where said adjusting element is a binary-blazed-type diffraction grating having a number p of steps, where p is not smaller than 4 and no more than 6; and
   a photo detector that receives said return light beams of said first light beam, said second light beam and said third light beam passing through said adjusting element; and
   wherein said first light emitting portion and said third light emitting portion are arranged in such a way that the optical axis of said first light beam and the optical axis of said third light beam approximately coincide with each other.

2. The optical pickup device according to claim 1, wherein said adjusting element is a phase-differential-type diffraction grating.

3. The optical pickup device according to claim 2, wherein a relation expression of $$1.0 \leq (n_1-1)/(n_3-1) \leq 1.08$$

is satisfied, where the wavelength of said first light beam is $\lambda_1$, the refractive index of the diffraction grating is $n_1$ for said first light beam, the wavelength of said third light beam is $\lambda_3$, and the refractive index of the diffraction grating is $n_3$ for said third light beam.

4. The optical pickup device according to claim 1, wherein said first wavelength is approximately 405 nm, said second wavelength is approximately 650 nm, and said third wavelength is approximately 780 nm.

5. The optical pickup device according to claim 1, wherein said second light emitting portion is provided next to either said first light emitting portion or said third light emitting potion, and the light beam emitted from said second light emitting portion and the light beam emitted from the light emitting portion next to said second emitting portion are in approximately parallel to each other.

6. The optical pickup device according to claim 1, wherein the return light beams of said first light beam and said third light beam received by said photo detector are the zero-order diffracted light beams respectively.

7. The optical pickup device according to claim 1, wherein the step height d of said binary-blazed diffraction grating is expressed by $$d \approx m\lambda_3/(n_3-1)$$

where the wavelength of said third light beam is $\lambda_3$, the refractive index of said diffraction grating is $n_3$ for said third light beam, and m is an integer number not smaller than 1.

8. An optical disc device comprising:
   a rotationally drive mechanism that rotationally drives an optical disc as an optical recording medium; and
   an optical pickup device that performs at least either to record onto or to reproduce from said optical disc being rotationally drive by said rotational drive mechanism, the optical pickup device comprising:
   a first light emitting portion that emits a first light beam with a first wavelength;
   a second light emitting portion that emits a second light beam with a second wavelength;
   a third light emitting portion that emits a third light beam with a third wavelength;
   an adjusting element that controls the optical axis of the return light beam of said second light beam reflected by said optical recording media, where said adjusting element is a binary-blazed-type diffraction grating having a number p of steps, where p is not smaller than 4 and no more than 6; and
   a photo detector that receives said return light beams of said first light beam, said second light beam and said third light beam passing through said adjusting element; and
   wherein said first light emitting portion and said third light emitting portion are arranged in such a way that the optical axis of said first light beam and the optical axis of said third light beam approximately coincide with each other.

* * * * *